US008352567B2

(12) United States Patent
Hesselink et al.

(10) Patent No.: US 8,352,567 B2
(45) Date of Patent: *Jan. 8, 2013

(54) VCR WEBIFICATION

(75) Inventors: Lambertus Hesselink, Atherton, CA (US); Dharmarus Rizal, Paulo Alto, CA (US); Joep van Beurden, Cupertino, CA (US); Eric S. Bjornson, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 550 days.

This patent is subject to a terminal disclaimer.

(21) Appl. No.: 10/795,071

(22) Filed: Mar. 5, 2004

(65) Prior Publication Data

US 2004/0172449 A1    Sep. 2, 2004

Related U.S. Application Data

(60) Division of application No. 09/608,685, filed on Jun. 29, 2000, now Pat. No. 6,732,158, which is a continuation-in-part of application No. 09/454,178, filed on Dec. 2, 1999, now Pat. No. 6,499,054.

(51) Int. Cl.
*G06F 15/16* (2006.01)
*H04N 7/173* (2011.01)
(52) U.S. Cl. ......... 709/208; 709/221; 709/222; 725/102
(58) Field of Classification Search .................. 709/208, 709/220–222; 725/102
See application file for complete search history.

(56) References Cited

U.S. PATENT DOCUMENTS

| | | |
|---|---|---|
| 5,526,037 A | 6/1996 | Cortjens et al. |
| 5,537,141 A | 7/1996 | Harper et al. |
| 5,600,834 A | 2/1997 | Howard |
| 5,623,601 A | 4/1997 | Vu |
| 5,634,052 A | 5/1997 | Morris |
| 5,644,714 A | 7/1997 | Kikinis |

(Continued)

FOREIGN PATENT DOCUMENTS

CA    2136150    5/1996

(Continued)

OTHER PUBLICATIONS

Ronald M. Tol et al., TV Anytime: Store It on My TV, Conference on Consumer Electronics, 2000 Digest of Technical Papers, ICCE 2000, IEEE, pp. 30-31.*

(Continued)

*Primary Examiner* — Patrice Winder

(57) ABSTRACT

An apparatus, method and service model are disclosed which simplify conventional methods for schedule recordings of television programs and enable users to control recording equipment from any location via the Internet. Entities connected to computer networks such as the Internet and web-browser software can schedule recordings of television programs and/or operate the recording equipment. In an example scenario, a user who maintains recording equipment at home may utilize the present invention from his or her workplace or vacation place, accesses a service provider website using her/his user name and password, views the a schedule of television programs provided by a broadcaster or other distributor of programming and selects the television programs to be recorded. The application service provider in turn transmits the selected television program information to a computer connected to a later described remote control unit to execute and operate the recording of selected programs. In this manner, the present invention enables anyone with internet access to remotely operate recording equipment to record television programs.

22 Claims, 12 Drawing Sheets

U.S. PATENT DOCUMENTS

| | | | |
|---|---|---|---|
| 5,692,214 A | 11/1997 | Levine | |
| 5,745,906 A | 4/1998 | Squibb | |
| 5,793,952 A | 8/1998 | Limsico | |
| 5,793,964 A | 8/1998 | Rogers et al. | |
| 5,805,442 A | 9/1998 | Crater et al. | |
| 5,835,911 A | 11/1998 | Nakagawa et al. | |
| 5,841,976 A | 11/1998 | Tai et al. | |
| 5,845,282 A | 12/1998 | Alley et al. | |
| 5,850,449 A | 12/1998 | McManis | |
| 5,878,213 A | 3/1999 | Bittinger et al. | |
| 5,886,707 A | 3/1999 | Berg | |
| 5,893,119 A | 4/1999 | Squibb | |
| 5,907,322 A | 5/1999 | Kelly et al. | |
| 5,930,473 A | 7/1999 | Teng et al. | |
| 5,935,212 A | 8/1999 | Kalajan et al. | |
| 5,946,697 A | 8/1999 | Shen | |
| 5,956,487 A | 9/1999 | Venkatraman et al. | |
| 5,960,177 A | 9/1999 | Tanno | |
| 5,968,131 A | 10/1999 | Mendez et al. | |
| 5,974,446 A | 10/1999 | Sonnenreich et al. | |
| 5,982,362 A | 11/1999 | Crater et al. | |
| 5,983,350 A | 11/1999 | Minear et al. | |
| 5,990,884 A | 11/1999 | Douma et al. | |
| 6,002,768 A | 12/1999 | Albanese et al. | |
| 6,012,086 A | 1/2000 | Lowell | |
| 6,014,451 A | 1/2000 | Berry et al. | |
| 6,014,706 A | 1/2000 | Cannon et al. | |
| 6,021,118 A | 2/2000 | Houck et al. | |
| 6,052,750 A | 4/2000 | Lea | |
| 6,065,062 A | 5/2000 | Periasamy et al. | |
| 6,078,961 A | 6/2000 | Mourad et al. | |
| 6,081,508 A | 6/2000 | West et al. | |
| 6,081,693 A | 6/2000 | Wicks et al. | |
| 6,085,192 A | 7/2000 | Mendez et al. | |
| 6,085,227 A | 7/2000 | Edlund et al. | |
| 6,101,265 A | 8/2000 | Bacus et al. | |
| 6,104,716 A | 8/2000 | Crichton et al. | |
| 6,105,067 A | 8/2000 | Batra | |
| 6,133,909 A * | 10/2000 | Schein et al. | 715/721 |
| 6,173,112 B1 | 1/2001 | Gruse et al. | |
| 6,182,094 B1 | 1/2001 | Humpleman et al. | |
| 6,182,139 B1 | 1/2001 | Brendel | |
| 6,182,226 B1 | 1/2001 | Reid et al. | |
| 6,184,863 B1 | 2/2001 | Sibert et al. | |
| 6,198,905 B1 * | 3/2001 | Remschel | 434/350 |
| 6,212,327 B1 | 4/2001 | Berstis et al. | |
| 6,212,558 B1 | 4/2001 | Antur et al. | |
| 6,219,669 B1 | 4/2001 | Haff et al. | |
| 6,223,289 B1 | 4/2001 | Wall et al. | |
| 6,230,203 B1 | 5/2001 | Koperda et al. | |
| 6,233,589 B1 | 5/2001 | Balcha et al. | |
| 6,255,961 B1 * | 7/2001 | Van Ryzin et al. | 340/825.25 |
| 6,261,103 B1 | 7/2001 | Stephens et al. | |
| 6,263,371 B1 | 7/2001 | Geagan, III et al. | |
| 6,275,942 B1 | 8/2001 | Bernhard et al. | |
| 6,288,753 B1 | 9/2001 | DeNicola et al. | |
| 6,304,895 B1 | 10/2001 | Schneider et al. | |
| 6,366,930 B1 | 4/2002 | Parker et al. | |
| 6,377,573 B1 | 4/2002 | Shaffer et al. | |
| 6,401,239 B1 | 6/2002 | Miron | |
| 6,408,435 B1 | 6/2002 | Sato et al. | |
| 6,427,161 B1 | 7/2002 | LiVecchi | |
| 6,437,803 B1 | 8/2002 | Panasyuk et al. | |
| 6,445,872 B1 | 9/2002 | Sano et al. | |
| 6,463,459 B1 | 10/2002 | Orr et al. | |
| 6,499,054 B1 | 12/2002 | Hesselink et al. | |
| 6,513,068 B1 | 1/2003 | Jones et al. | |
| 6,553,422 B1 | 4/2003 | Nelson | |
| 6,571,245 B2 | 5/2003 | Huang et al. | |
| 6,581,092 B1 | 6/2003 | Motoyama et al. | |
| 6,588,013 B1 * | 7/2003 | Lumley et al. | 725/32 |
| 6,615,088 B1 * | 9/2003 | Myer et al. | 709/220 |
| 6,625,623 B1 | 9/2003 | Midgley et al. | |
| 6,640,241 B1 | 10/2003 | Ozzie et al. | |
| 6,654,746 B1 | 11/2003 | Wong et al. | |
| 6,668,288 B1 | 12/2003 | Midwinter et al. | |
| 6,714,968 B1 | 3/2004 | Prust | |
| 6,714,982 B1 | 3/2004 | McDonough et al. | |
| 6,732,158 B1 | 5/2004 | Hesselink et al. | |
| 6,732,269 B1 | 5/2004 | Baskey et al. | |
| 6,754,678 B2 | 6/2004 | Norris et al. | |
| 6,754,707 B2 | 6/2004 | Richards et al. | |
| 6,785,716 B1 * | 8/2004 | Nobakht | 709/219 |
| 6,799,248 B2 | 9/2004 | Scherr | |
| 6,804,718 B1 | 10/2004 | Pang et al. | |
| 6,892,225 B1 | 5/2005 | Tu et al. | |
| 6,898,636 B1 | 5/2005 | Adams et al. | |
| 6,938,042 B2 | 8/2005 | Aboulhosn et al. | |
| 6,973,482 B2 | 12/2005 | Mohammed et al. | |
| 6,981,050 B1 | 12/2005 | Tobias et al. | |
| 7,020,778 B1 | 3/2006 | Miettinen et al. | |
| 7,043,644 B2 | 5/2006 | DeBruine | |
| 7,058,696 B1 | 6/2006 | Phillips et al. | |
| 7,069,310 B1 | 6/2006 | Bartholomew | |
| 7,114,080 B2 | 9/2006 | Rahman et al. | |
| 7,124,372 B2 | 10/2006 | Brin | |
| 7,127,745 B1 | 10/2006 | Herse et al. | |
| 7,237,114 B1 | 6/2007 | Rosenberg | |
| 7,254,786 B2 | 8/2007 | Henriquez | |
| 7,404,207 B2 | 7/2008 | Perry | |
| 7,424,543 B2 | 9/2008 | Rice, III | |
| 7,437,429 B2 | 10/2008 | Pardikar et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,895,334 B1 | 2/2011 | Tu et al. | |
| 7,917,628 B2 | 3/2011 | Hesselink et al. | |
| 7,934,251 B2 | 4/2011 | Hesselink et al. | |
| 2001/0009014 A1 | 7/2001 | Savage, III et al. | |
| 2001/0013127 A1 | 8/2001 | Tomita et al. | |
| 2001/0018701 A1 | 8/2001 | LiVecchi | |
| 2001/0046366 A1 * | 11/2001 | Susskind | 725/87 |
| 2001/0053274 A1 * | 12/2001 | Roelofs et al. | 725/37 |
| 2002/0023143 A1 | 2/2002 | Stephenson et al. | |
| 2002/0042830 A1 | 4/2002 | Bose et al. | |
| 2003/0084104 A1 | 5/2003 | Salem et al. | |
| 2003/0191911 A1 | 10/2003 | Kleinschnitz, Jr. et al. | |
| 2004/0075619 A1 | 4/2004 | Hansen | |
| 2005/0028208 A1 * | 2/2005 | Ellis et al. | 725/58 |
| 2005/0188002 A1 | 8/2005 | Yang | |

FOREIGN PATENT DOCUMENTS

| | | |
|---|---|---|
| CA | 2462448 | 4/2010 |
| CN | 02823077.9 | 6/2008 |
| DE | 197 40 079 A1 | 3/1999 |
| EP | 0 805 594 A2 | 11/1997 |
| EP | 0 917 052 A1 * | 5/1999 |
| EP | 0986225 A1 | 3/2000 |
| IN | 214359 | 2/2008 |
| JP | 08-314835 | 11/1996 |
| JP | H10-155131 | 6/1998 |
| JP | 4667747 | 1/2011 |
| KR | 10-0994666 | 11/2010 |
| WO | WO 97/13368 | 4/1997 |
| WO | 9718636 A2 | 5/1997 |
| WO | 9817064 A1 | 4/1998 |
| WO | WO 98/17064 A1 * | 4/1998 |
| WO | 9921118 | 4/1999 |
| WO | 9950994 A2 | 10/1999 |
| WO | 0005903 | 2/2000 |
| WO | 0011832 | 3/2000 |
| WO | 01/31875 | 3/2001 |
| WO | 01/31875 | 5/2001 |
| WO | 0135599 A2 | 5/2001 |
| WO | 0140961 A1 | 6/2001 |
| WO | 0175836 A2 | 10/2001 |
| WO | 0178349 A2 | 10/2001 |
| WO | 0237380 | 5/2002 |
| WO | 03044676 A1 | 5/2003 |
| WO | 2004046852 A2 | 6/2004 |

OTHER PUBLICATIONS

Ramesh Jain, The convergence of PCs and Tv, IEEE Multimedia, vol. 6, Issue 4, Oct. 1999, p. 1.*

Internet cite http://www.ni.com/labview/; LabVIEW from National Instruments; dated Jan. 18, 2000; p. 1 of 1.

National Instruments Manual entitled *LabVIEW—Instrumentation and Analysis Software*; pp. 61, 63, 75 & 76; Jan. 2000.

Jim Henry, Controls. Laboratory Teaching via the World Wide Web, ASEE, Jun. 1996, 4 pages.

Jim Henry, Laboratory Teaching via the World Wide Web, ASEE Southeastern Section Paper, Apr. 1998, 11 pages.

Scharf, R. et al. Using Mosaic for Remote Test System Control Supports Distributed Engineering, NCSA Mosaic and the Web Conference, Oct. 1994, 9 pages.

Arpaia, et al., A Measurement Laboratory on Geographic Network for Remote Test Experiments. May 18-21, 1998, pp. 206-209A.

Golberg, et al., Beyond the Web: manipulating the real world. 1995, pp. 209-219.

Shen, et al., Conducting Laboratory Experiments over the Internet. vol. 42. Aug. 1999, pp. 180-185.

Bird, VPN Information on theWorld Wide Web. Http://vpn.shmoo.comlvpn/vpn-general.html, pp. 1-2, Apr. 28, 2003.

International Search Report and Written Opinion dated Jan. 17, 2008, from PCT/US04/37608, filed Nov. 13, 2004, 14 pages.

Nishimura et al., Real-Time Camera Control for Videoconferencing Over the Internet, 5th. International Conference on Real-Time Computing Systems and Applications, pp. 121-124, Oct. 1998.

Richardson, et al., Virtual Network Computing. Http://computer.org/internet, pp. 33-38, Jan.& Feb. 1998.

Zhe Wang et al., Persistent Connection Behavior of Popular Browsers, retrieved from http://pages.cs.wisc.edu/~cao/papers/persistent-connection.html, Dec. 1998, 4 pages.

Canadian Office Action in related Western Digital case 2,725,655 dated Mar. 1, 2011.

Office Action Dated Feb. 23, 2010, issued in connection with KR application 10-2005-7008962.

Office Action Dated Feb. 8, 2010, issued in connection with JP application 2001-541955.

Office Action Dated Sep. 3, 2010, issued in connection with EP02782342.6.

* cited by examiner

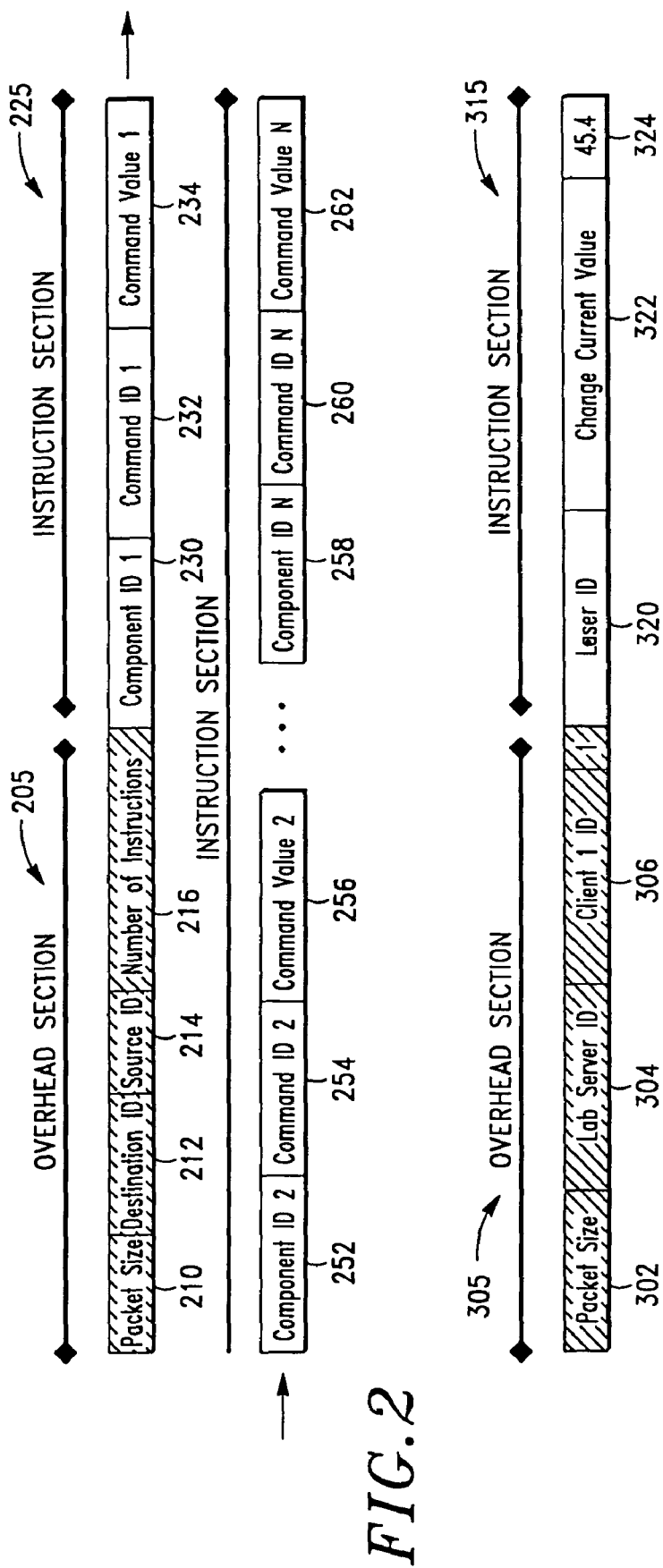

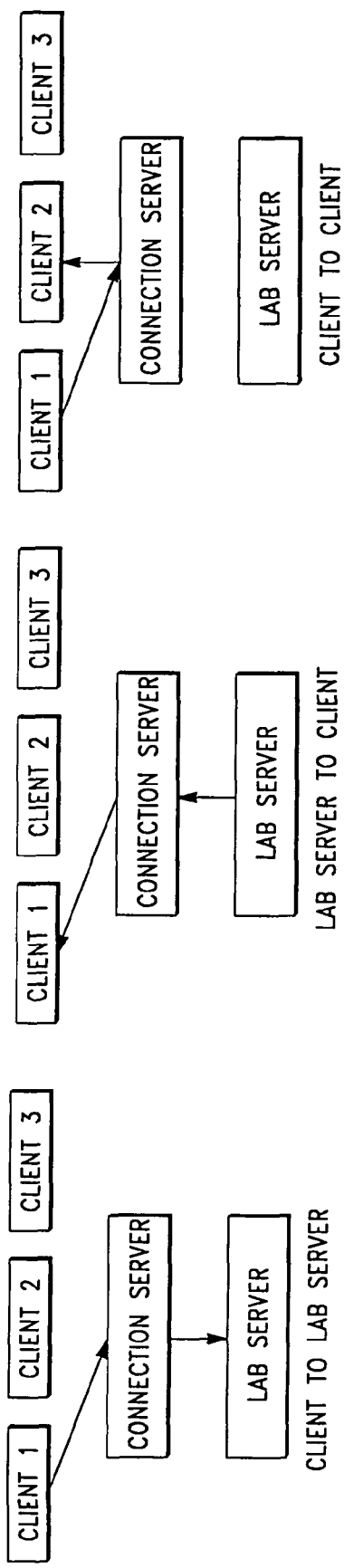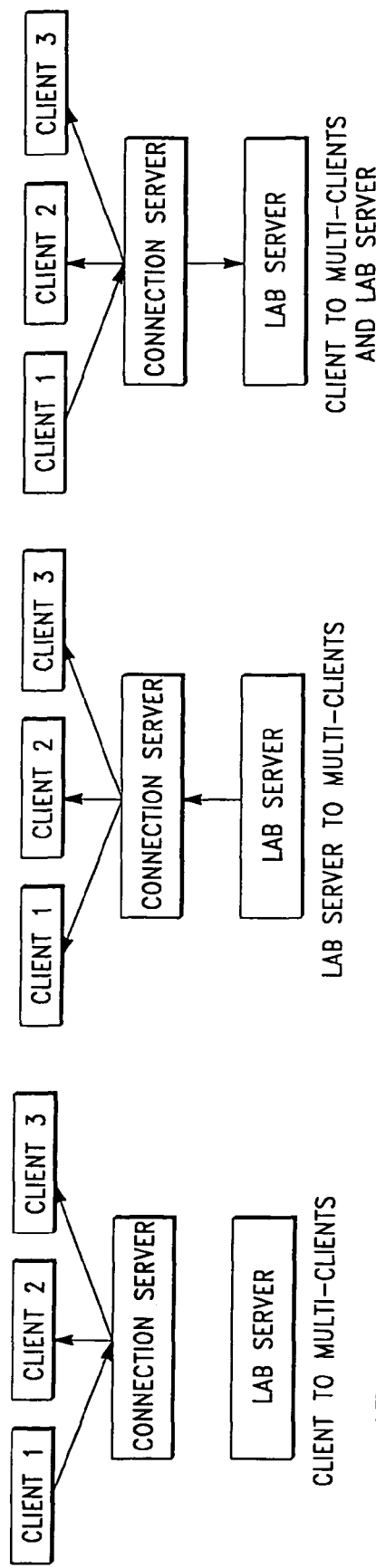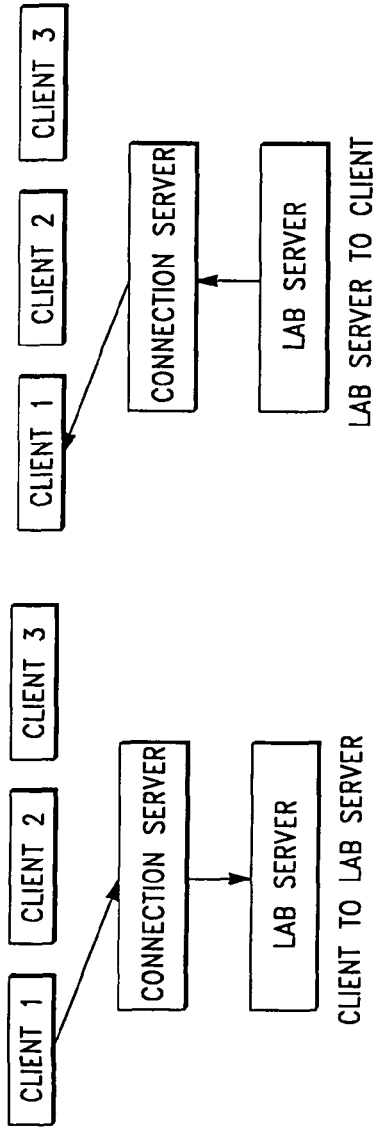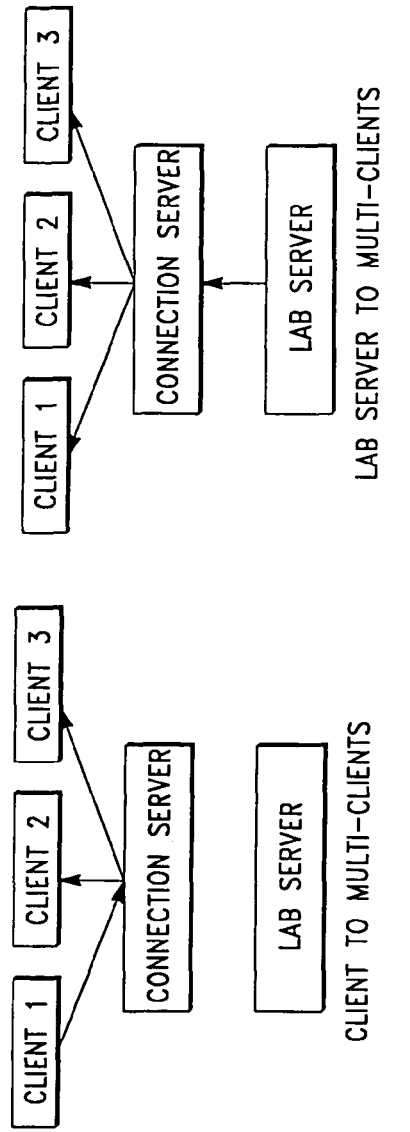

VCR WEBIFICATION

This application is division of co-pending application Ser. No. 09/608,605, filed Jun. 29, 2000, which is a continuation in part of application Ser. No. 09/454,178, filed Dec. 2, 1999, which is now U.S. Pat. No. 6,499,054, issued on Dec. 24, 2002. Application Ser. No. 09/608,605, application Ser. No. 09/454,178 and U.S. Pat. No. 6,499,054 are incorporated herein by reference in their entireties and to which applications we claim priority under 35 USC §120.

FIELD OF THE INVENTION

The present invention relates broadly to the remote control of signal recording equipment. Specifically, the present invention relates to the control of remotely located recording equipment via a computer network.

BACKGROUND OF THE INVENTION

Most consumer video/audio recording equipment today such as the video cassette recorder (VCR) is equipped with scheduling features. Scheduling features allow users to schedule recording of television programs based on user-specified time and channels. Most equipment can be controlled by remote control. However, for average users the process of scheduling television program recordings can be cumbersome. The user must be present at the location of recording equipment where a remote control unit is situated within an effective operating distance of the recording device. In the case where the remote control unit transmits commands in the form of infrared signals, the remote control unit must also establish line of sight to the recording equipment. Before operating a timer mechanism in conjunction with the recording equipment, the internal clock of video/audio recording equipment must be set to conform to local time. A user reviews schedule information of television programs to be recorded, such as program date, time and channel. A user typically selects a desired program to be recorded and enters schedule information using the remote control unit into the recording equipment. This step may consist of several key entries on the remote control units, since for every intended consecutive scheduled recording, the user specifies the time to begin recording as well as the time to terminate recording.

U.S. Pat. Nos. 5,692,214 and 5,988,078 to Levine teach implementations of an electronic schedule stored in memory to allow cursor based programming on a conventional video recorder through use of an associated personal computer. The computer communicates with the video recorder via infrared signals of the type used for remote control of the video recorder. Programming schedule information may be provided to the personal computer from a remote database by telephonic communication, broadcast, or use of disposable memories. A remote transmitter connected to the personal computer is used at the time of the recording to send signals to the video recorder to initiate recording of a preselected program, allowing unattended programming memory of the video recorder to initiate recording of a specific channel at a proper time. The method taught by Levine includes the steps of providing at the viewing location a computerized unit having an operator input and a modem; establishing a connection to a wide area network through the modem; transmitting information to a service provider regarding the geographical location of the particular viewing location; and receiving from the service provider information specific to the type of programming available to the particular viewing location. However, neither of the Levine patents address the problem of trying to operate a video recorder from a remote location.

SUMMARY OF THE INVENTION

The present invention addresses the problems identified above and provides an apparatus, method and service model which simplify conventional methods for schedule recordings of television programs and enable users to control recording equipment from any location via the Internet. Entities connected to computer networks such as the Internet and web-browser software can schedule recordings of television programs and/or operate the recording equipment. In an example scenario, a user who maintains recording equipment at home may utilize the present invention from his or her workplace or vacation place, accesses a service provider website using her/his user name and password, views the a schedule of television programs provided by a broadcaster or other distributor of programming and selects the television programs to be recorded. The application service provider in turn transmits the selected television program information to a computer connected to a later described remote control unit to execute and operate the recording of selected programs. In this manner, the present invention enables anyone with internet access to remotely operate recording equipment to record television programs.

Another attendant advantage of the present invention is an inexpensive solution to provide global connectivity of the Internet to existing recording equipment. The present invention can be utilized to operate recording equipment such as video cassette recorders, that typically have infrared sensors to receive control commands. Other recording equipment such as DVD recorders, hard drive based video recorders, etc. can also be controlled using the present invention.

BRIEF DESCRIPTION OF THE DRAWINGS

The forgoing aspects and many of the attendant advantages of the present invention will become more readily apparent in the following detailed description and accompanying drawings, wherein:

FIG. 2 illustrates the DNP packet format utilized in the present invention;

FIG. 3 shows a packet sent from a client process to a lab server;

FIGS. 8A-8F display several routing modes that may be performed by the connection server;

DETAILED DESCRIPTION

Figure 1A:
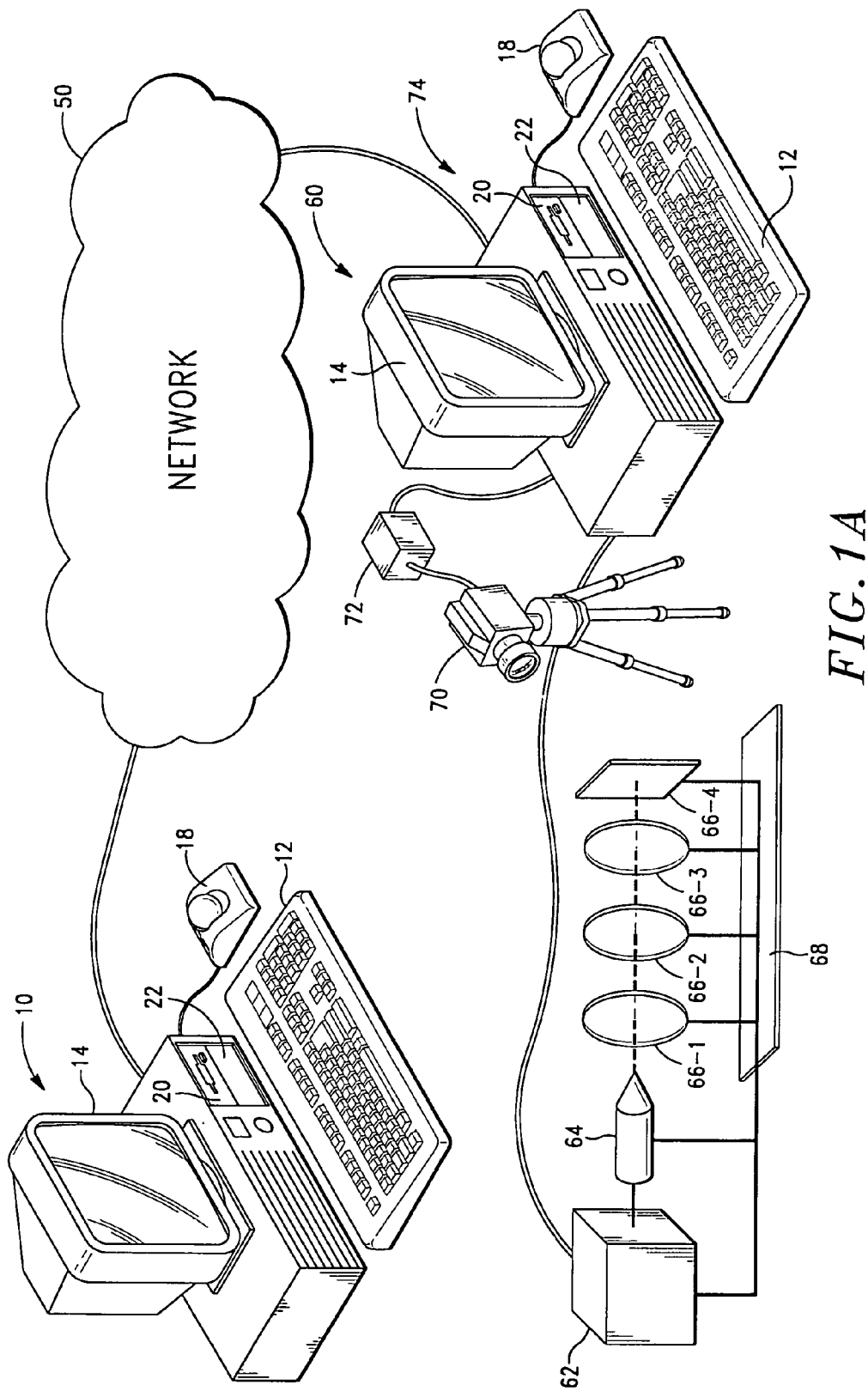
FIG. 1A is a diagrammatic representation of the computer network utilized by the present invention.

FIG. 1A shows a computer 10 connected via a computer network such as Internet 50 to computer 60 that manipulates devices in a laboratory. Computers 10, 60 may have a conventional design, incorporating a processor chassis utilizing a central processing unit (CPU), various memory and supporting integrated circuitry. Connected to the processor is a keyboard 12 and monitor 16. A user may control the computer 10 using the keyboard 12 or mouse 18 to manipulate a cursor moved about on the screen of the monitor 14 to make selections in programs executed on the computer 10. Floppy drive 20 and hard disk 22 may also be incorporated in the computers 10, 60.

Although a desktop type of computer is illustrated, it is to be understood that other forms of computers, such as workstations, laptops, palm tops, dumb terminals, or any computer capable of communicating with other computers may be used in connection with embodiments of the present invention.

Computers 10, 60 may communicate over the computer network 50 via modem and telephone line. An operating system and browser program may also be included in computers 10, 60 so that a user may access the laboratory. However, other media may also be used, such as a direct connection or high speed data line. The computer network 50, as described above, may be a large and complex system, incorporating a vast number of nodes and components.

Computer 60 is located at a laboratory where physical processes are to be conducted. For illustrative purposes, the operation of a laser and optical equipment is described herein, but it is to be understood that other types of physical processes may be used in connection with the present invention. An interface 62 is connected to the processor in computer 60 that allows a user to control laser 64. The beam from laser 64 may be directed through various optical equipment 66, which may be adjusted on table 68 by interface 62. In an embodiment of the present invention, interface 62 may use a PCI-GPIB board to control and monitor laser 64. To acquire images of the laser beam that have been processed by optical equipment 66, a CCD detector that transmits digitized images to a IMAQ PCI-1424 board may be used. The optical equipment 66 may be mechanically adjusted and aligned by motorized stages on which the equipment is mounted. To display live pictures of the processes and equipment, an IMAQ PCI-1408 board may be used to digitize the analog video signal from camera 70. Motion of camera 70 may be controlled by a motion control system available through a software application such as LabView, which may be stored and executed on computer 60. Camera 70 is provided with frame grabber 72 to provide video feedback of the physical process, and are controlled by the video server 72, which may be executed on the processor of computer 60. System software on computer 60 may also include IMAQ Vision for G that provides image processing libraries such as a Fast Fourier Transform (FFT) routine to speed up development of live data analysis software.

Figure 1B:
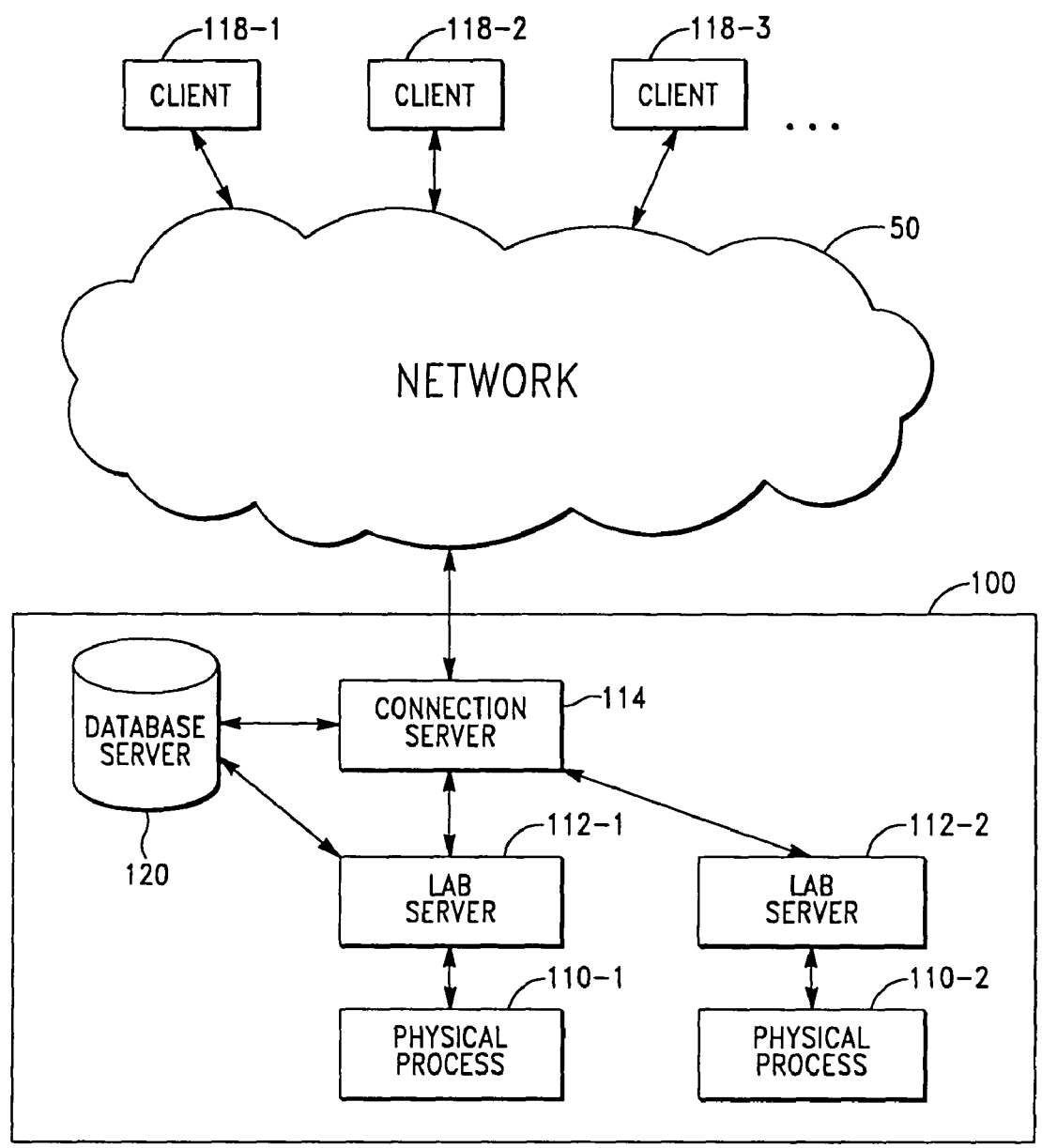
FIG. 1B is a diagrammatic representation in block form of the system architecture of the present invention.

Directing attention to FIG. 1B, the system architecture 100 integrates hardware and software that facilitate two-way communication between physical processes 110 to on-line users across computer networks. The system can be divided into several processes based on functionality: physical processes 110, lab server 112, connection server 114, clients 118, database server 120. These processes can be implemented as software programs that are executed in computing devices such as computers. As used herein, physical processes 110 are defined as physical, biological and/or chemical processes or phenomena that can be detected, measured, quantified and/or controlled by electronic devices such as detectors, sensors, motors, power source, etc. to various interfaces such as GPIB, RS-232, PCI, USB, ethernet, etc., the electronic devices that monitor and control the physical processes 110 and communicate with computer 60 that runs the lab server process 112.

Data from the physical processes 110 are collected by the lab server 112 for purposes of storing into the database via the database server 120 and/or distributing to the clients 118 via the connection server 114. Prior to sending data, the lab server 112 can also perform analysis and transformation of the data such as statistics and FFT computation. The lab server 112 also receives data from the clients 118 such as control commands through the connection server 114. After analyzing these commands, the lab server 112 then passes the commands to the electronic devices or equipment (i.e. laser, motors, detectors, etc.). As shown in FIG. 1B, there are multiple physical processes 110, namely physical process 110-1 and physical process 110-12, as well as multiple lab servers 112-1, 112-2.

The connection server 114 serves as the distributor of data that accepts, verifies and routes information from data sources to appropriate destinations. The connection server 114 supports full duplex point-to-point and point-to-multipoints data transmissions between the clients 118, lab server 112, and database server 120. Several transmission modes will be discussed below. Additionally, the connection server 114 also monitors the status of network connections throughout the entire process.

The clients' processes 118 provide user interfaces (UI) for users' input and output functions. The clients' processes 118 are implemented as software programs that can be run on clients' computing devices such as desktop computers. The client also establishes two-way communications with the connection server 114. Data from the connection server 114 are decoded and displayed according to associated formats such as the video, graph, LED displays, etc.

In a preferred embodiment, communications between the processes above are carried out using a common language, such as Data Network Protocol (DNP). Besides transporting various data types, DNP also carries network and communications related messages between different processes. DNP packet format is also discussed in the later sections.

The lab server 112 may reside at the location of the physical process 110 to have direct local control of the physical process. The lab server 112 is the process that broadcasts data from the physical process 110 and well as control the physical process 110 based on requests from clients 118. The lab server 112 can be implemented as a multi-threaded software that implements communication functions across computer networks such as the internet 116. To provide universal and reliable communications, all data can be transported using standard connection based network protocols such as Transmission Control Protocol/Internet Protocol (TCP/IP). Each connection (in this case between the lab server process 112, connection server process 114, and clients 118) is commonly called socket that consists of a network or IP address and a port number. However, the data itself and other communication messages are encoded in a format called Data Network Protocol (DNP). In the OSI network model, DNP can be considered as an application layer protocol like HTTP and FTP. The unique design of DNP provides a common language between different processes that enables collaborative environments between multiple users across the internet.

DNP is designed to carry various types of digital data such as float, integer, Boolean, video and arrays of data. Data is encoded using DNP into one information entity called a packet that has two main sections: the overhead section 205 and instruction section 225. Directing attention to FIG. 2, the DNP packet format is illustrated. The overhead section 205 may contain the following fixed-size fields:

Packet size 210: the length of the entire packet normally in byte words (8 bits unit).

Destination ID 212: may contain client ID, lab server ID, connection server ID, all-clients-group ID, all-clients-and-lab-server-group ID, or connection server group ID where the packet is sent.

Source ID 214: may contain client ID, lab server ID or connection server ID where the packet is originated.

Instruction number 216: contains the number of instructions following the overhead section 205. For example in FIG. 2, there are N instructions.

The instruction section 225 may contain a number of instructions. Each instruction can be a specific command or request that contains the following fields.

Component ID 230: identification number of specific device/equipment for user interface component.

Command ID 232: identification number of specific command/request to be performed.

Command Value 234: parameter values used to perform the commands or requests. Based on the associated command/request, the data type of common values can vary (i.e. float data, integer data, video data, array of data). Consequently this field has variable size. Both sender and receiver of the request may have a look-up list of data types associated with the component ID's and command ID's. Hence, the data type information need not be carried in the packet itself. The instruction section may be extended to include component ID's, command ID's and command values 252-262. FIG. 3 shows an example packet sent from a client 118 to a lab server 112 that is a request to change the current value of laser equipment to 45.4 mA. In overhead section 305 there is a packet size section 302, a lab server ID section 304 and a client ID section 306. In instruction section 315 there is a laser ID section 320, a change current value section 322 and the target milliamps 45.4 in section 324.

Figure 4:
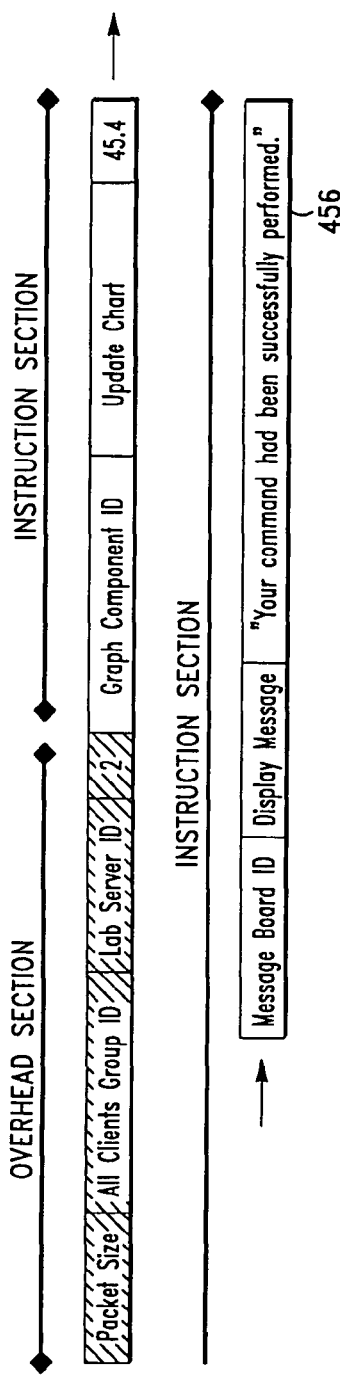
FIG. 4 shows a response packet sent from the lab server 112 to a client process.

FIG. 4 shows a typical response packet from the lab server 112 to all clients 118 to update two of their user interface components: a graph and message board display with a value of 45.4 and a message in message section 456 which reads, "your command has been successfully performed."

Two main functions may be performed by the lab server: broadcast data from the physical processes 110; and perform clients' requests and general associated responses. To keep clients 118 up to date with the current states of the physical processes 110, the lab server 112 can broadcast information that is directly collected from the physical processes 110. Data from the physical processes 110 that are encoded in the DNP packet are transmitted to connections server 114 for distribution. The connections server can then look at the overhead section of the transmitted DNP packet and forward the packet to appropriate destinations. Details on the routing algorithm in the connections server are discussed below.

Sensors, detectors and other measurement instruments detect and/or measure various physical phenomena (i.e. electric fields, electromagnetic radiation, temperature, pressure, etc.), and send this information to the lab server 112. The lab server 112 that has established network connection to the connections server 114 can then put the received information or its computed analysis into the instruction section of the DNP packet. This process can be repeated if more than one instruction is needed to be sent. Once all the instructions have been written in the instruction section of the DNP packet, the corresponding overhead sections can also be constructed. Once the DNP packet is complete, it can then be sent to the connections server 114.

Figure 5:
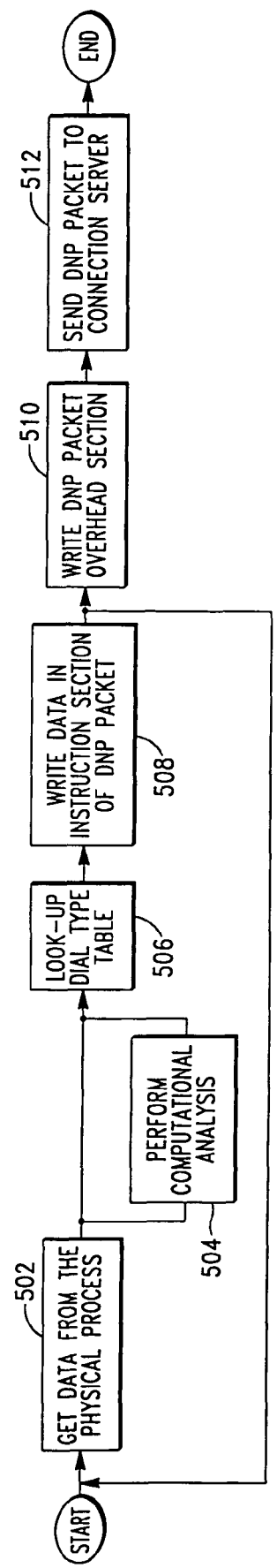
FIG. 5 is a flow chart illustrating the logical sequence of steps for the lab server to transmit raw data from physical processes for calculating results based on computational analysis of the raw data.

Directing attention to FIG. 5, the lab server 112 can broadcast the raw data from physical processes 110 for calculating results based on computational analysis of the raw data. In some cases, data from the physical process 110 are analyzed for the purposes of scientific visualization, statistical analysis or data compression. For example, raw video data from the physical process are analyzed for both spatial and temporal redundancy. After performing a compression algorithm, the compressed format of the video data is written to the instruction section of the DNP packet. Video compression that is suitable for this application is described below. For the clients to receive a continuous update of information the entire process in FIG. 5 can be repeated on a periodic basis. The repetition period of this process can be adjusted according to a particular application. At step 502 the lab server 112 gets data from the physical process 110. Control may proceed to optional step 504, where the lab server 112 performs computational analysis. Control proceeds to step 506 where a lookup data type table is constructed. Control proceeds to step 508 where data is written in the instruction sections of the DNP packet. This may be part of an iterative loop where control returns to step 502. Control may also proceed from step 508 to step 510 where the DNP packet is written to the overhead section. Control continues to step 512 where the DNP packet is sent to the connections server 114.

Figure 6:
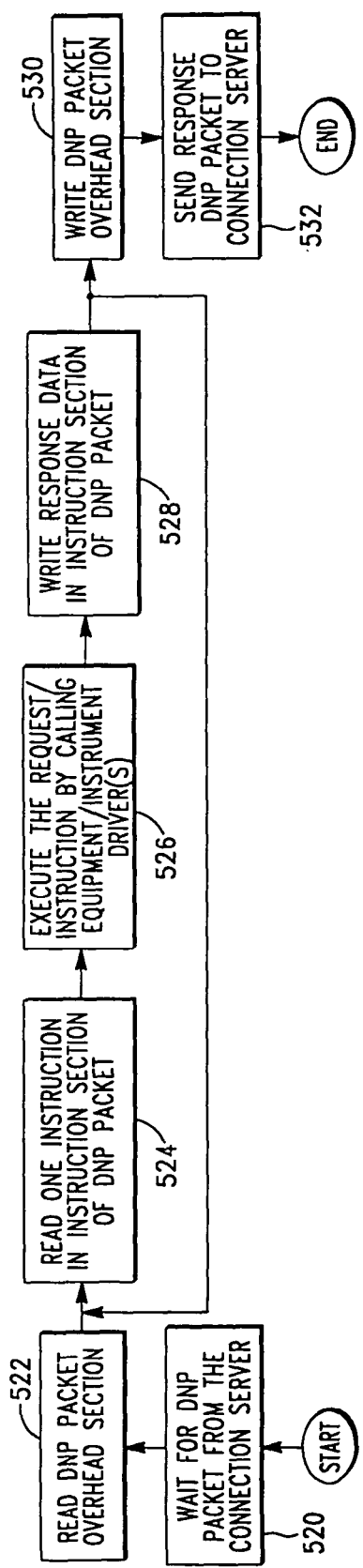
FIG. 6 is a flow chart illustrating the logical sequence of steps for the lab server to interpret client instructions, execute the commands and generate responses.

Another function of the lab server 112 is to process clients' requests and generate associated responses. The lab server 112 can receive a DNP packet from the connections server 114 that contains the clients' requests for instructions. It is the responsibility of the lab server 112 to interpret these instructions, execute the commands and generate responses. This process is described in FIG. 6. Control begins at step 520 where the lab server 112 waits for the DNP packet to be received from the connections server 114. Proceeding to step 522, the overhead section of the DNP packet is read. Control continues to step 524, where one instruction in the instructions section of the DNP packet is read. Control proceeds to step 526, where the lab server 112 executes the request/instruction by calling equipment/instruction drivers. Control proceeds to step 528, where the lab server 112 writes response data in the instruction section of the DNP packet. From step 528, control may return to step 524 in an iterative loop according to the number of instructions; control may also proceed to step 530, where the DNP packet is written to the overhead section. Control proceeds to step 532, where a response DNP packet is sent to the connections server 114.

Execution of a client's requests may involve calling particular software drivers that send the commands to instruments via the associated computer interface such as GPIB, RS-232, USB, ethernet, etc. The request may also contain instructions for information management such as recording the client's request, storing collected values from instruments, and querying previously collected information. In the case of information management, the lab server 112 can interact directly with local or remote database servers through standard database drivers such as ODBC or JDCB.

Unlike the broadcasting functions that may continuously send DNP packets to clients, this function of the lab server 112 only generates responses when client requests are received. When the lab server 112 is implemented in a software program, this function may be run in a separate thread for parallel processing with other functions.

The connections server 114 can be run in the same computer where the lab server 112 resides. For additional reliability, in the preferred embodiment the connections server 114 may be executed in a separate computer. The connections server 114 may be implemented using object oriented, network-enable and multi-threaded software development environments such as JAVA or C++. Two of the main functions performed by the connections server 114 include: monitoring and maintaining reliable network connections with all active clients and lab servers; and routing DNP packets to appropriate destinations.

The connections server 114 maintains network connections with all the processes, namely: lab server 112, database server 120, and clients 118. A connection handler, which may be a class or object in object-oriented programming terminology, can perform readings from and writing to each of the connections. Each connection handler should be run in a separate thread for parallel processing. Once the connections server 114 accepts or establishes a connection, it can then pass the connection information (i.e. the socket information that contains remote post address and remote port number) to the connection handler for further processing. The connections server 114 maintains an array or table of connection handlers, namely the connection table, to perform and monitor network related processes. A connection monitor is another important process included in the connections server 114 that runs on a periodic basis. The connection monitor may be implemented as a subclass of the connections server 114 and may be executed in a separate thread. A function of the connection monitor is to monitor and control the network communications of the processes (i.e. clients 118 and lab server 112) connected to the connections server.

Figure 7:
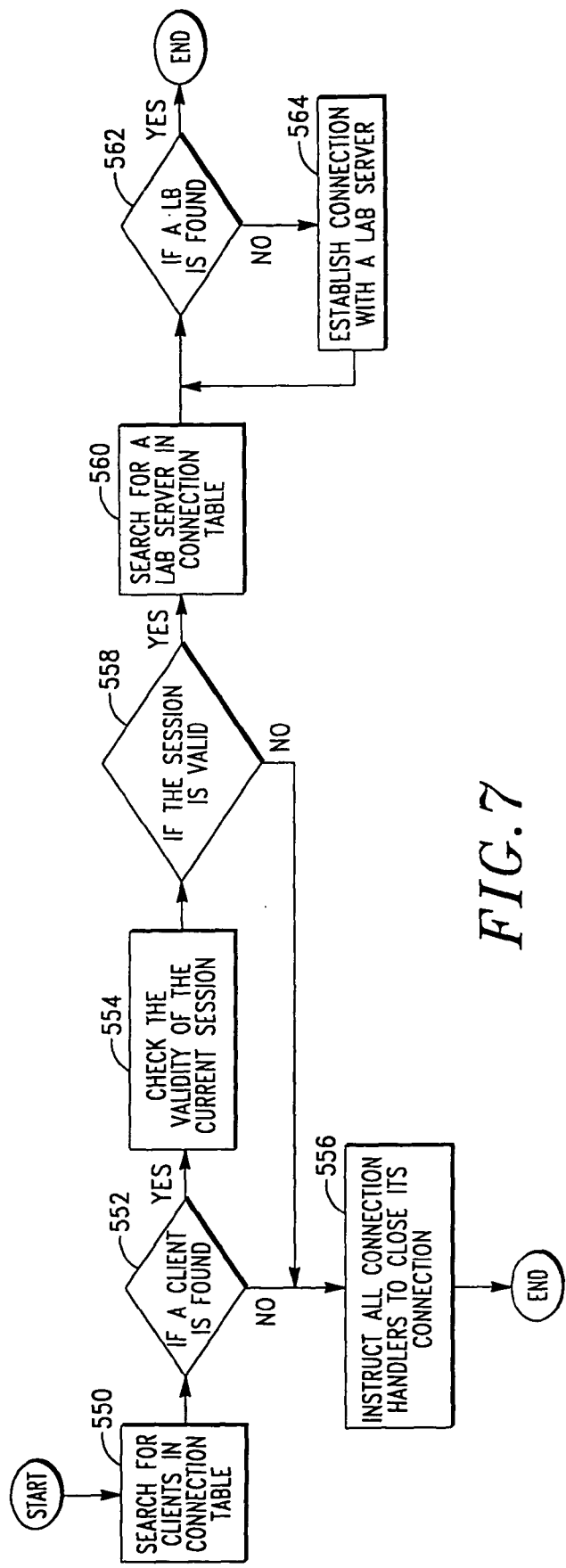
FIG. 7 is a flowchart illustrating the basic operation of the connection monitor.

FIG. 7 illustrates the basic operation of the connection monitor. Beginning at step 550, the connection monitor searches for clients in the connection table. Proceeding to decision step 552, if a client is found in the connection table, control proceeds to step 554 where the connection monitor checks the validity of the current session. This operation is normally done by consulting the database server 120 to check whether the current clients have access to the physical process 110. If a client is not found, control proceeds from decision step 552 to 556, where the connection monitor instructs all connection handlers to close their connections. Returning to step 554, control proceeds to decision step 558. If the session is valid, control proceeds to step 560; otherwise control returns to step 556. At step 560, the connection monitor searches for a lab server 112 in the connection table. Control proceeds to decision step 562, where, if a lab server is found, the program terminates. Otherwise, control proceeds to step 564, where the connection monitor establishes a connection with a lab server 112. As shown in FIG. 7, the operation of checking whether a lab server 112 is connected is performed in a loop, since there may be more than one lab server 112 contacted for backup purposes. If a failure in the system or device at the physical process 110 occurs, the lab server 112 that is physically connected to the physical process 110 would refuse any connection requests from the connection server. Thus, the connection monitor attempts to establish connection with another lab server 112. The entire operation in FIG. 7 should be performed periodically to continuously monitor the communication process.

The connections server serves as the distributor of data that accepts, verifies and routs DNP packets to appropriate destinations. The connections server supports full duplex point-to-point and point-to-multipoints data transmissions based on the destination ID field of the DNP packet. As a result, both clients 118 and lab server 112 processes may synchronously receive events that are generated by any processes. FIG. 8 displays several routing modes that may be performed by the connections server. FIG. 8 is an example case of three clients and a lab server connected to the connections server. The maximum number of clients that may be served varies according to the available network bandwidth.

Figure 9:
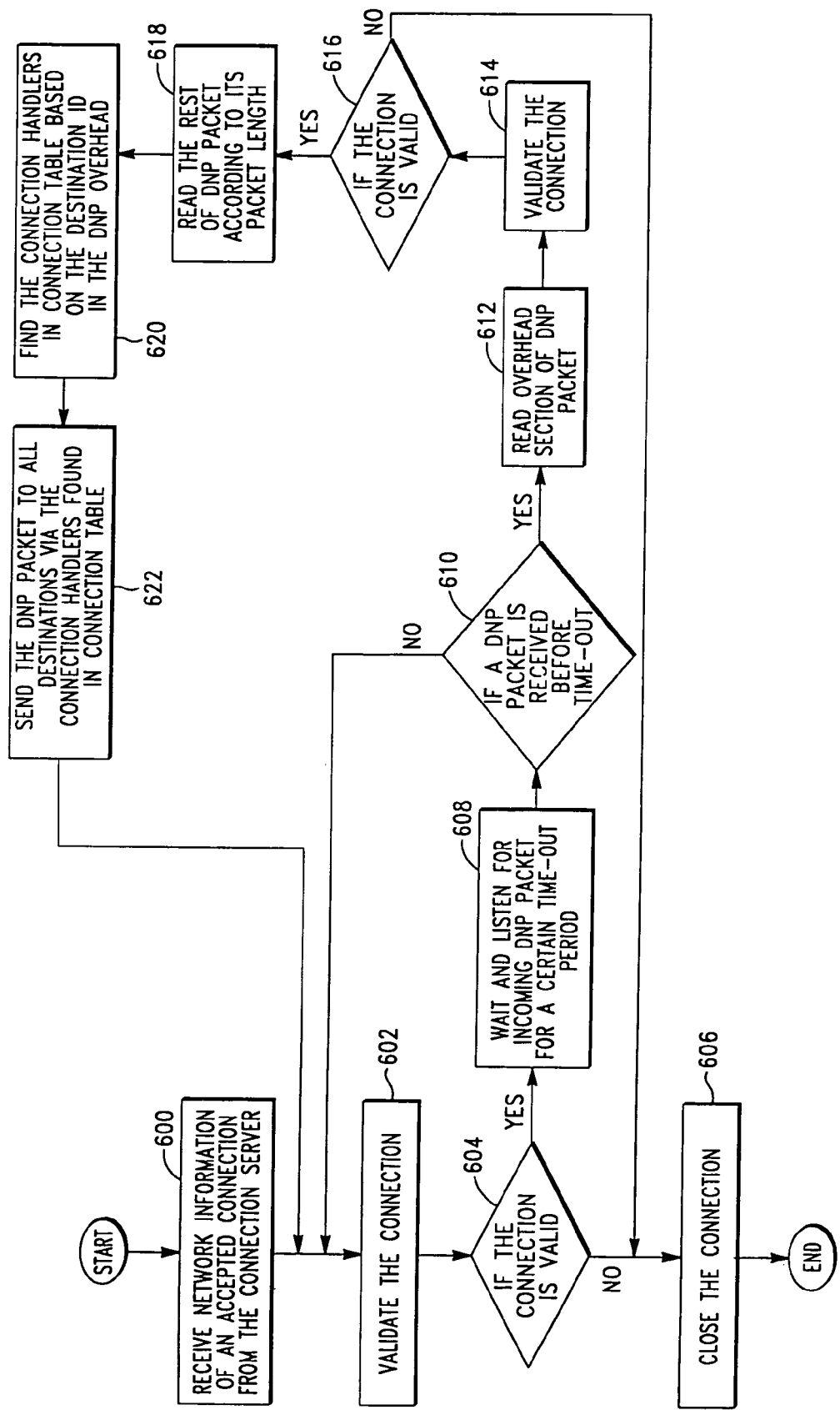
FIG. 9 is a flowchart illustrating the basic operation of the connection handler.

As discussed above, the connection handler is part of the connections server and may perform reading from and writing to each connection. The connections server 114 listens to any connection request, and passes the network information to the connection handler once a valid connection is established. FIG. 9 shows the flow diagram of the connection handler. Beginning at step 600, the connection handler receives network information from an accepted connection from the connections server. Control proceeds to step 602, where the connection handler checks to see if the connection is valid. If the connection is not valid (decision step 604), control proceeds to step 606, where the connection handler closes the connection and control terminates. However, if the connection is valid, control proceeds to step 608, where the connection handler waits and listens for incoming DNP packets for a certain time-out period. From step 608, control proceeds to decision step 610. At decision step 610, if a DNP packet is received before the time-out, control proceeds to step 612, where the overhead section of the DNP packet is read. However, if a DNP packet is not received before the time-out, control returns to step 602. From step 612, control proceeds to step 614, where again the connection handler attempts to validate the connection. If the connection is not valid (decision step 616), control returns to step 606. However, if the connection is valid, control proceeds to step 618, where the rest of the DNP packet is read according to its packet length. Control then proceeds to step 620, where connection handlers in the connection table are found based on the destination ID in the DNP overhead section. Control then proceeds to step 622, where all DNP packets are sent to all destinations via the connection handlers found in the connection table. From step 622 control returns to step 602. The operations described above are repeated until the connection is no longer valid.

Client processes provide a graphical user interface for the end users of the physical process 110. The clients may be implemented in any object-oriented and network-enabled software development environment such as C++ or JAVA. The client should contain graphical components that may be used for getting user inputs and/or display information. Some of the components may include dials, graphs, switches, LED displays, buttons, etc.

The client process 118 may be executed from any computer that is connected to a TCP/IP network such as the internet. When the client process is run, it will first attempt to establish network connections to the connections server 114. User requests/commands that are received from the UI components are encoded into DNP packets to be sent to the connections server 114. The client 118 may also process DNP packets from other remote clients and lab servers 112 that are received via the connections server 114. This operation may also be executed in a separate thread for parallel processing.

Figure 10:
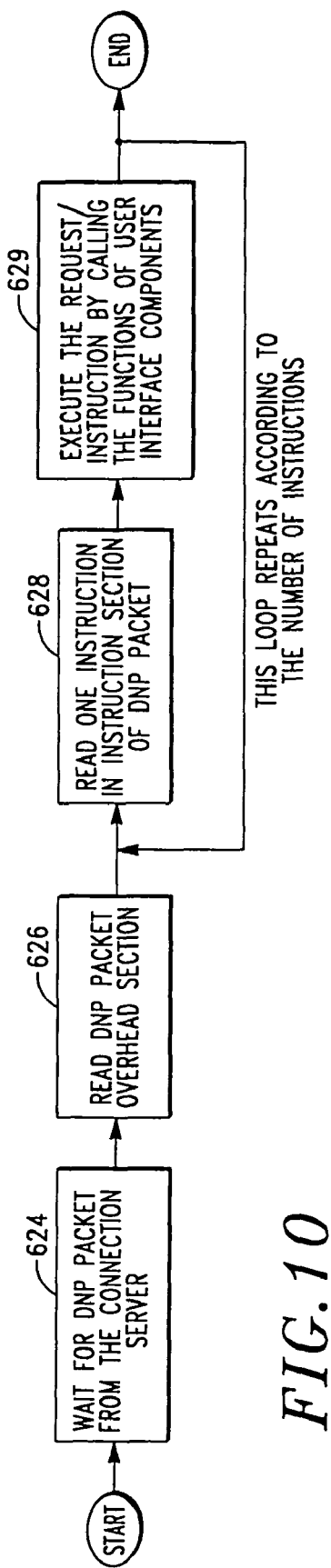
FIG. 10 is a flowchart illustrating client DNP packet processing.

FIG. 10 is a flow diagram of a client DNP packet processing. The client process 118 normally executes the instructions in a DNP packet by calling functions or methods of its UI components. The instructions may involve updating the graph display, turning a dial, decoding and displaying video data, etc. By receiving live events from physical processes 110 and other client processes, the user may experience an interactive and collaborative environment in controlling remote physical processes. Beginning at step 624, the client waits for DNP packets from the connections server 114. Control then proceeds to step 626, where the DNP packet's overhead section is read. Control then proceeds to step 628, where one instruction in the instruction section of the DNP packet is read. Control then proceeds to step 629, where the request/instruction is executed by calling the functions of the user interface components. From step 629, control may return to step 628 in a loop that repeats according to the number of instructions.

The database server 120 manages a database containing information that is essential to the operation of other processes. The remote operation of the database server 120 can be facilitated using database application programming interface standards such as ODDC or JDDC. The database server 120 manages the following list of information: user information, user physical process data, scheduling information, and event data.

The database server 120 manages user profiles. A user profile contains user accessed information such as log-in name and password that enables the connections server 114 to verify connection requests from the clients 118. In addition, the user profile also includes the client's progress information by tracking the status of accomplished actions/requests. Data from the physical processes 118 (i.e. sensor readings, states of equipment, etc.) may also be recorded on behalf of a client's request. This data be time stamped and may be made available to the user via an interactive "laboratory notebook" user interface. Using a common gateway interface (CGI) or JAVA servlet program that may interact with the database server 120, clients may search and retrieve previously recorded physical process data. The search may be based on chronological order, keyword, or other characteristics of the recorded data. Scheduling information ensures that only the appropriate clients are given access to the physical processes 110 in a certain time period. Every event received by the lab server may also be automatically recorded. This data may be used to analyze clients' behavior and usage patterns in controlling the physical process 110. The interactive laboratory notebook may also contain lab parameters, "to do" lists, and personal notes.

The interactive laboratory notebook is part of a user interface that may be constructed using Interface Builder or similar software application, and may be accessed by users during the course of an experiment. The interactive laboratory notebook may be implemented to include a database stored on a hard disk or other nonvolatile memory of computer 60, as well as a user interface to access the database. Where the present invention is utilized for distance learning, the interactive laboratory notebook provides a central repository for information and is an essential tool for instructors to evaluate the progress and performance of students using the online laboratory.

The user interface may include animated switches, dials, buttons, and LED displays rather than traditional browser forms. Online graphing of the real time data along with other customized user interface components allows users to experience a hands-on look and feel. The user interface may closely resemble the front panels of the actual instruments in functionality, layout, and appearance. The live video stream may also be included in the user interface.

Real Time Video Observation

Observing physical processes in real time via the internet is a key feature of the present invention. Returning to FIG. 1B, video camera 70 is used to acquire live images from a system that the user interacts with and whose actions affect the observed video. Video capture (or frame grabber) hardware 72 is used on a computer to capture images desired to be sent to the user with minimum latency. A video server computer 74 compresses new image data and forms packets to be transmitted to the user (client) through the computer network 50. The client, using a standard browser, is able to view the live video and interact with the system. In order to transmit video via the internet in real time, spatial and temporal compression is performed. In spatial compression, the acquired image from frame grabber 72 is represented as gray-scale or as a color image in terms of hue, saturation, and value (HSV). In both cases values are represented as integers. The image data is divided into square blocks (8×8 pixels or 16×16 pixels, for example). A two-dimensional discrete cosine transform (a standard mathematical operation often abbreviated as DCT) is performed on each block.

To perform temporal compression, the server 74 subtracts the ideal DCT data from the DCT data that the client currently holds. This difference in DCT data is the information that the client must receive in order to allow its video to be updated to the desired image. This compression uses a single new frame to calculate data to be sent. This sacrifices compression efficiency (i.e. that obtained using the MPEG4 standard) in order to minimize latency. An approximation to this difference is calculated which meets the requirements of the specified fixed packet size (specified in bits). By basing compression on a specified packet size, compressed video matches transmission limitations of the client 110. The data rate (PACKET_SIZE*PACKETS_PER_SECOND) that is used for a particular client is dynamically determined and updated as video is sent. This allows the quality of video that is sent to a client to vary according to the abilities of each client's internet connection. This also allows the data rate to vary in response to changes in a client's allowable data rate. By having the client intermittently inform the server of the times that it received transmitted packets, the latency and allowable data rate of the client may be calculated.

Figure 11:
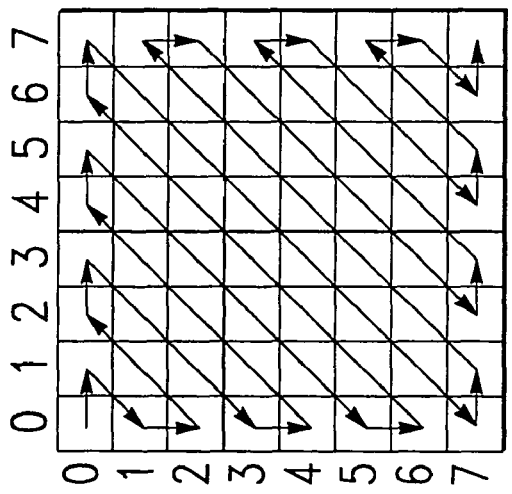
FIG. 11 is a diagrammatic representation of a two-dimensional set of DCT components.

FIG. 11 shows the two-dimensional set of DCT components. Component 0 is in the upper left corner, and the path of the arrow shows the order that each component is enumerated. DCT components are transmitted in groups of components (i.e. eight groups of eight components). Not all groups of DCT components are transmitted in a single packet. Groups of "difference in DCT data" are chosen to be sent based on the magnitude of the components in the group. In eight SV images, the eye is more sensitive to differences in value than to differences in hue or saturation. Thus a relative weight is used in comparing the magnitudes of groups or of a different type. Data is transmitted with rounding in order to use fewer bits to transmit an approximation of the data. The video compression system has been optimized to minimize response time (latency). This priority is unique for a system that depends on the user promptly receiving video feedback in response to his actions.

Figure 12:
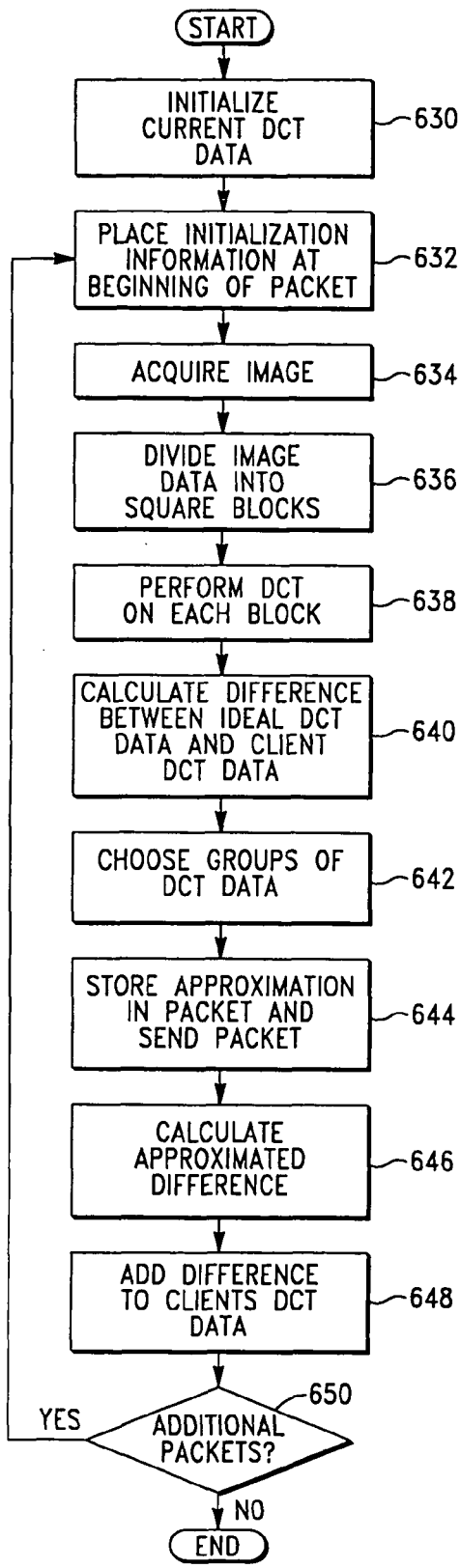
FIG. 12 is a flowchart illustrating the logical sequence of steps executed by the server for performing the encoding process.

FIG. 12 illustrates the encoding process performed by server 74. Beginning at step 630, where, if this is the first packet being transmitted, then initialization information is placed at the beginning of the packet. This initialization information includes: width of display, height of display and type of display (gray-scale or HSV). Control proceeds to step 634, where an image is acquired using video camera 70 and frame grabber 72. At step 636, image data is divided into square blocks (8×8 pixels or 16×16 pixels). At step 638 a two-dimensional discrete cosine transform is performed on each block. This produces the ideal DCT data which corresponds to an image with minimal error. At step 640, the difference between ideal DCT data and the DCT data that the client is currently using is calculated. This produces "difference in DCT data". At step 642 groups of "difference in DCT data" are chosen to be sent based on the magnitude of the components in the group. In HSV images, the eye is more sensitive to differences in value than to differences in hue or saturation. Thus a relative weight is used in comparing the magnitudes of groups that are of a different type. At step 644 an approximation to the data in these groups is stored in a packet which is then transmitted over the network through a socket connection with the client. At step 646, the approximate difference is calculated. Control proceeds to step 648, where the "approximated difference in DCT data" that the client will decode is then calculated by the server 74. At step 650, this difference is than added to the client's DCT data that the server 74 keeps a record of. By keeping track of the client's current data, the error caused by approximation does not propagate as multiple transmissions are sent. Control may then return to step 632 in order to produce another packet to be sent to the client.

Figure 13:
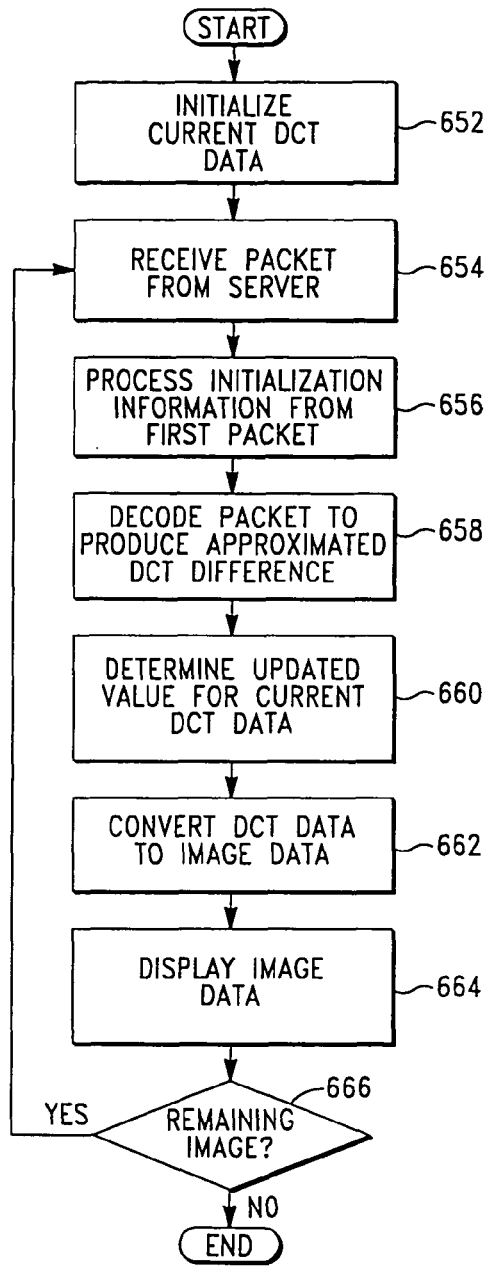
FIG. 13 is a flowchart illustrating the logical sequence of steps executed by the client process for performing the decoding process.

FIG. 13 illustrates the structure of the decoding process performed by the client. Beginning at step 652, the current DCT data is initialized to zero. At step 654 a socket connection is used to receive a packet from the server 74. At step 656, if this is the first packet received, initialization information is processed. This initialization information includes: width of display, height of display and type of display (gray-scale or HSV). At step 658, the packet is decoded to produce the approximated difference in DCT data. At step 660, by adding this difference back to the current DCT data, the updated value of the current DCT data is determined. Control proceeds to step 662, where the inverse discrete cosine transform is then used to convert DCT data into image data. This transformation is only performed on blocks that have been modified by the approximated difference in DCT data. This allows the image data to be updated with no buffering, and thus the delay in updating the image is minimized. Control proceeds to step 664, where the image data is displayed to the user through a standard browser. In step 666, control may then return to step 654 in order to process an additional updated image sent from the server 74.

The instructions described above as well as the user interface and interactive laboratory notebook may be implemented in software and stored in the computer 60 and executed in accordance with the preferred embodiment of the present invention.

While the description above explains the operation of a laser and optical equipment, it is to be understood that a wide variety of physical processes may be performed using the present invention, and other forms of data may be recorded such as time, temperature, voltage, current, magnetic field, electromagnetic radiation, and the like. Additional applications of the present invention may extend to entertainment, for example the remote control of toys in an interactive setting, where multiple users may access computer 60 via the computer network 50 and play games involving multiple users. The real time video taught by the present invention is an integral part of such an application.

In other applications of the present invention, computer 60 and camera 70 may be utilized as a sales or development tool to demonstrate equipment or processes to prospective clients, customers, or developers by providing a demonstration of the equipment or processes in real time and eliminating the expenditure of resources required to travel to a location where the equipment or processes are located.

In embodiments of the present invention where video recording is to be performed in accordance with the present invention, two types of equipment are needed to record audio and video signals transmitted from a programming source: a tuning device capable of tuning/separating television channels among designated frequency bands, and a recording device capable of storing analog video/audio signals on recording media such as magnetic tape, magnetic disks or optical disks. Many recording devices such as VCRs are equipped with built-in television tuners. In this case, the process of recording television programs can be accomplished by manipulating a single piece of equipment. For recording devices that do not have built-in television tuners, broadcast television signals must be processed by tuning a particular television channel and converting such channel into video and audio signals prior to recording. Referring to FIG. 4, the process of recording television programs can be accomplished by manipulating both television receiver 1010 and recording device 1012. Most television receivers are equipped with a built-in tuner, however in some cases a set-top box 1014 such as a cable box or satellite receiver is used instead of a conventional tuner not only to tune television channels but also to decode paid programs such as premium channels, pay-per-view channels, etc. Programming is broadcast by a programming provider 1028.

Figure 15:
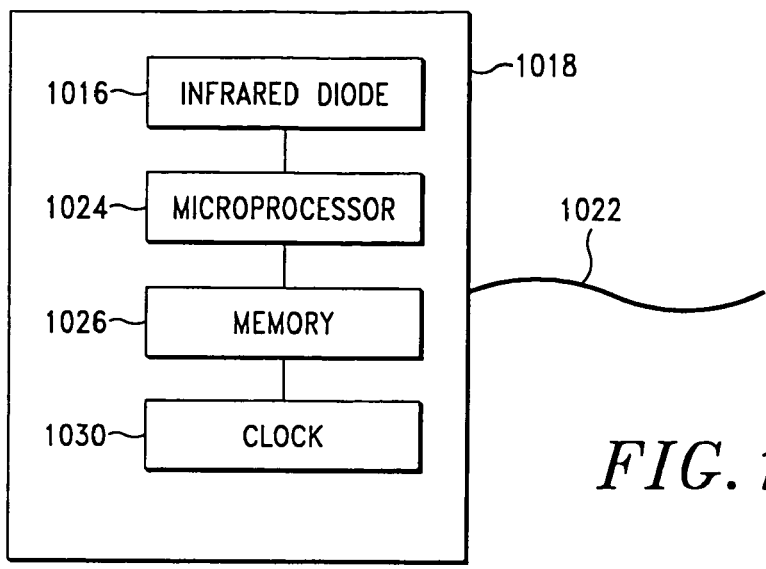
FIG. 15 illustrates in block diagram form the remote control device of an alternative embodiment present invention.

TV receiver 1010, recording device 1012 and set-top box 1014 are often equipped with infrared sensors that allow remote control from infrared transmitting devices operated within effective distance. Most remote control units emit infrared signal with a certain modulation method and carrier frequency to transmit digital commands for operating such devices. The methods used to demodulate such infrared signals vary by manufacturer. Many equipment manufacturers use conventional digital modulation methods such as on-off shift keying, pulse length modulation, etc. with carrier frequencies ranging from 20-60 kHz. By using a diode detector, such signals can be learned and stored in a conventional memory. Video/audio recording equipment is controlled by transmitting a sequence of stored commands using infrared emitting diode 1016 in the remote control unit 1018. FIG. 15 shows the preferred embodiment of remote control unit used in the present invention. The remote control unit 18 is connected to a computer 1020 via standard I/O connection 1022 such as RS-232, USB, etc. Computer 1020 is a conventional computer such as a workstation, desktop or laptop personal computer, or personal digital assistant (PDA), which includes a microprocessor and supporting circuitry, memory, and communications circuitry. Remote control unit 1018 includes a microprocessor 1024 and circuitry to control infrared diode 1016 to emit infrared commands that are stored in memory 1026. The microprocessor can control the transmission of such commands to emulate a particular sequence of commands to record TV programs that is conventionally performed by users operating the recording equipment 1012. Using the computer connection 1022, the microprocessor 1024 also executes the process of downloading information pertaining to user selections to be recorded. Such information may include start time, end time and channel number of selected television programs can be stored in memory 1026. Furthermore, the remote control unit may contain an internal clock 1030. Microprocessor 1024 can monitor and check the selected television programs stored in memory 1026 with the clock 1030 to start and stop the recording process.

In an alternative embodiment of the remote control unit 1018, the clock 1030 and/or memory 1026 can be excluded. In this case, the transmission of infrared signal from remote control unit 1018 is controlled using microprocessor, memory and clock of computer 1020. In this alternative embodiment the remote control unit 1018 and computer 1020 stay connected during the process of recording television programs.

In another alternative embodiment of the present invention, means for controlling the recording device 1012 and accessing an online-based application service provider 1032 can be built internal to the recording device 1012. In this case, recording device 1012 incorporates microprocessor 1024, memory 1026, clock 1030, modem 1034 and client software 1038 can be controlled through electronics means without any external device such as the remote control unit and computer.

Figure 14:
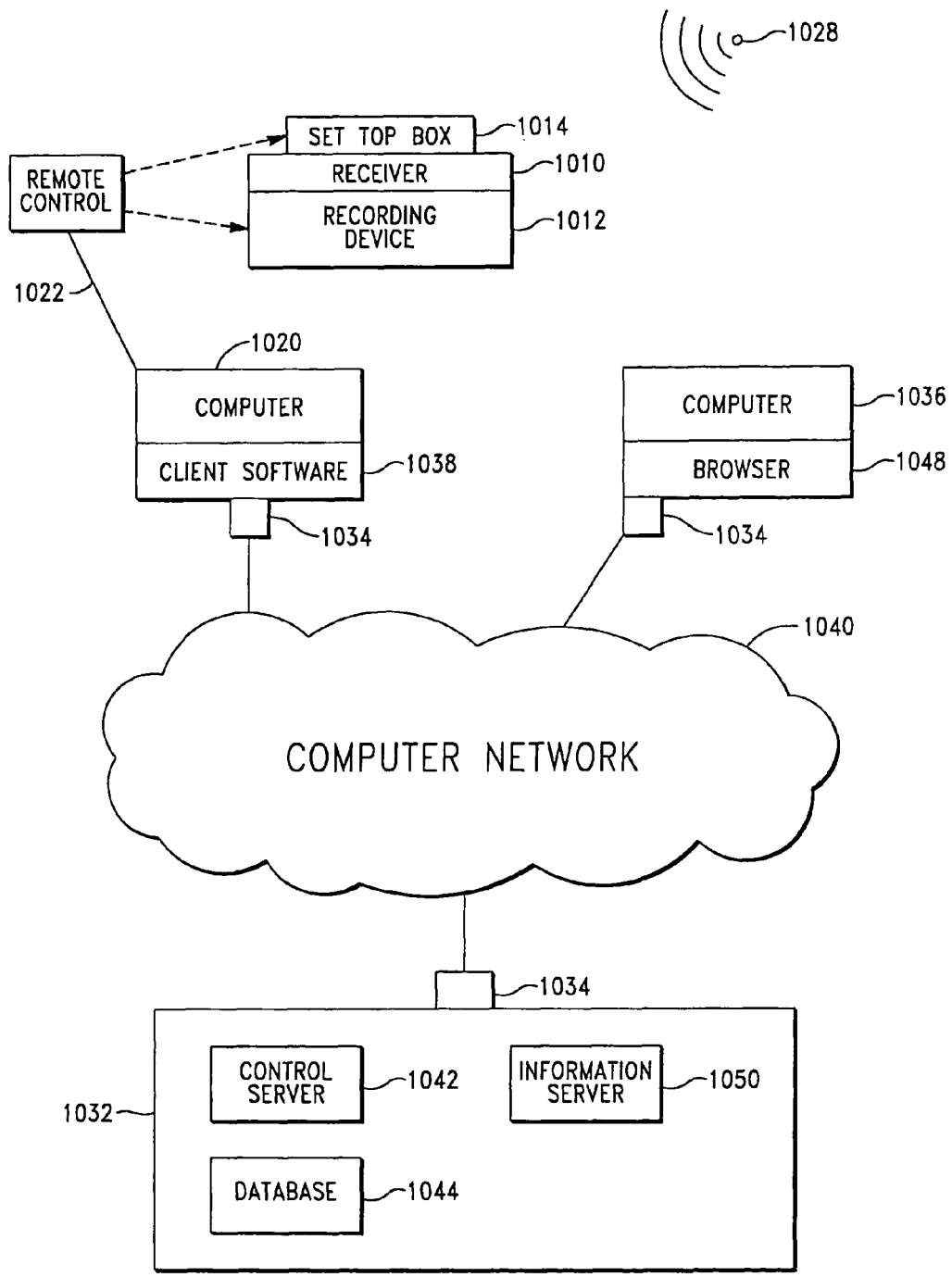
FIG. 14 illustrates in block diagram form the major components utilized in an alternative embodiment of the present invention.

Computer 1020 can include an application program such as Client Software 1038 executed by computer 1020 to receive user-selected TV scheduling information from the Application Service Provider 1032 and transmit such information to remote control unit 1018. As shown in FIG. 14, Computer 1020 is connected to a computer network 1040 such as a wide area network or public, global network such as the Internet. Computer 1020 also includes a modem or network interface unit to facilitate communication via network 1040. During start-up, Client Software 1038 establishes an IP (Internet Protocol) based network connection to Control Server 1042 located at the Application Service Provider 1032 site. It is recommended that Transmission Control Protocol (TCP) is used to implement such a network connection due to its reliability and connection-based properties. During initialization of the network connection, Client Software 1038 also transmits authentication information such as user id and/or password to allow Control Server 1042 to identify and verify the designated user account stored in database 1044. Once Control Server 1042 has authenticated and verified the connection request, it checks the user account in database 1044 for the selected TV programs to be transmitted to Client Software 1038. Control server 1042 may indicate the state of network connection to Client Software 1038 or record the status in database 1044. Information Server 1050 can receive new television information updates over the Internet. Information Server 1050 searches database 1044 to find an appropriate Control Server 1042 that maintains a valid connection with a Client Software 1038, and instructs Control Server 1042 to transmit such information to Client Software 1038. After the initialization of the network connection, Client Software 1038 waits for information updates of user selections transmitted by Control Server 1042. Whenever the information updates are received from Control Server 1042, Client Software 1038 transmits such information to remote control unit 1018 to be stored in the memory 1026. Once the selected television programs are stored in the memory 1026 of remote control unit 1018, the microprocessor 1024 then compares the selected television programs with clock 1030 to start and stop the recording process. A certain time delay may also be added before the start of the recording to skip preliminary section of the program. By connecting remote control unit 1018 with a computer 1020 that executes Client Software 1038, audio/video recording equipment can be operated from a wide area network such as the Internet.

Figure 16:
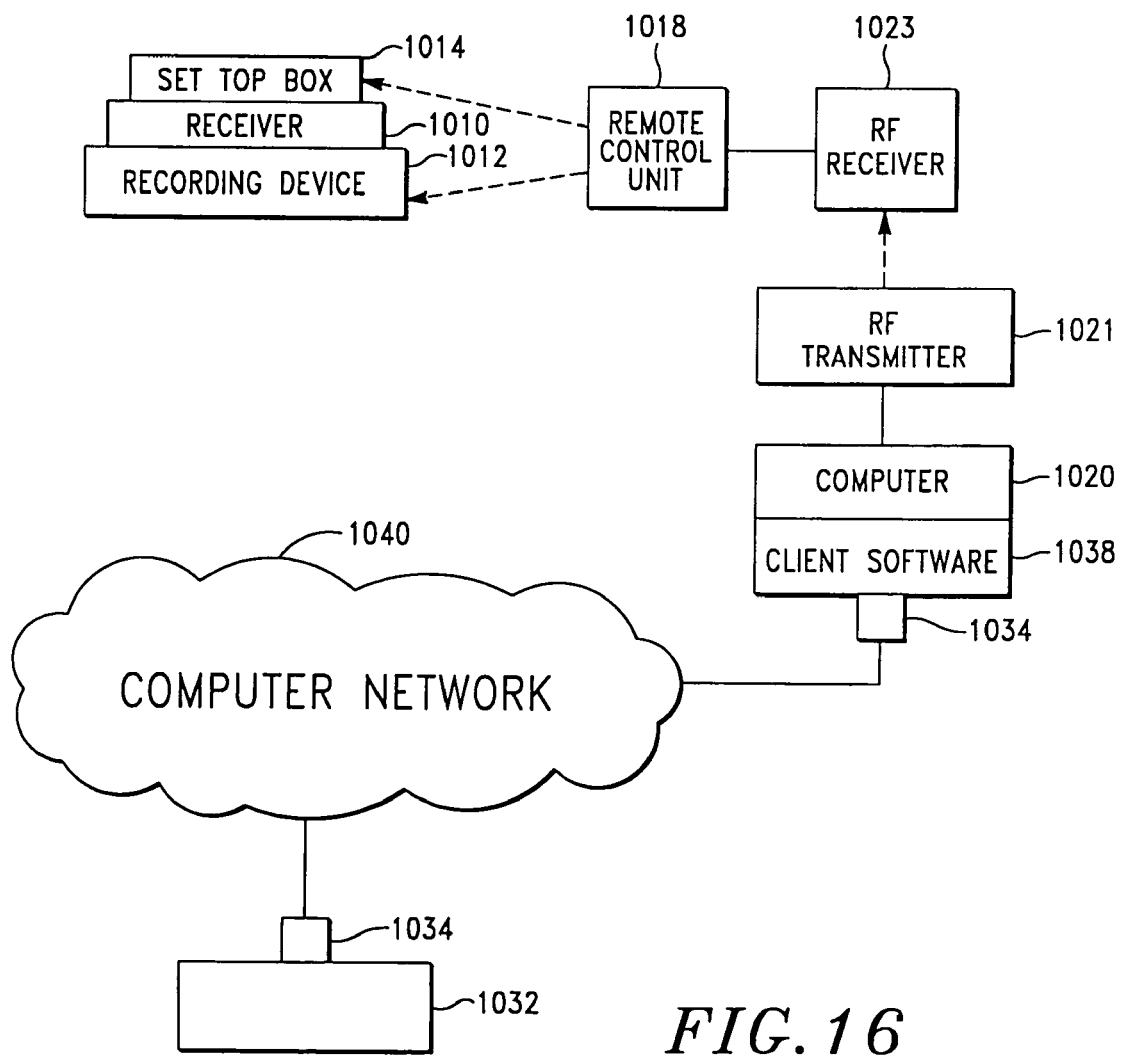
FIG. 16 illustrates another alternative embodiment of the present invention.

In the case where there is no line of sight between the remote control unit and the recording equipment, such as the case where computer 1020 and remote control device 1018 are located in different rooms, communication between remote control unit 1018 and computer 1020 can be performed using radio frequency (RF) transmitter 1021 and receiver 1023, as shown in FIG. 16.

Commands in the form of digital information can be encoded and modulated using RF frequency, which in turn is received an decoded by an RF receiver to be passed to remote control unit 1018 for controlling the audio/video recording equipment. A physical connection between the controlling computer (Computer 2) to either remote control unit 1018 (FIG. 14) or RF transmitter (FIG. 16) may be facilitated using a standard computer I/O connection such as RS-232, USB, and the like.

Internet-Based Service Model

The goals of the service model of the present system are to simplify the process of recording TV programs using existing audio/video recording equipment through an Internet-based user interface. Using standard web browser programs such as Netscape Navigator® or Microsoft Internet Explorer®, users can browse, search and select television programs to be recorded. In turn, the system will automatically obtain information about the selected television programs (such as start times, end times and channel numbers), and send such information to the remote control unit 1018 that operates the audio/video recording equipment.

Another goal of the service model of the present invention is to provide global access to audio/video equipment. Users can operate audio/video equipment from virtually anywhere through the Internet.

Yet another goal of the service model is to guide users in selecting TV programs by providing suggestions based on analysis of user preferences and viewing history.

In the preferred embodiment of the invention as shown in FIG. 14, a user operates Computer 1036 to access the Internet-based Application Service Provider 1032. Computer 1036 is a device that has a central processing unit, memory and communication means to access a wide area network such as the Internet. Computer 1036 can be in the form of desktop, lap top or palm top devices that have the appropriate web browser software 1048 installed in their memories. For widest access and compatibility, it is recommended that both Computer 1036 and Information Server 1050 use a standard and widely adopted network protocol such as TCP/IP. In the preferred embodiment, the HTTP protocol is chosen to facilitate network communications between Computer 1036 and Information Server 1050. In the preferred embodiment, Information Server 1050 is an HTTP compliant server and Computer 1036 is a conventional computer with a standard web-browser software such as Netscape Navigator® or Microsoft Internet Explorer®. Although Computer 1036 and Computer 1020 are two separate computers 1020,1036 as shown in FIG. 14, it is important to realize that the two functions served by Computers 1020,1036 can be accomplished by a single computer having the same components as both Computers 1020, 1036. The embodiment in FIG. 14 highlights the features in which the recording equipment can be globally accessed and controlled over the Internet.

Database 1044 is connected to Information Server 1050, facilitated by workstation or Local Area Network at the Application Service Provider 1032 site. Database 1044 may serve as a data center to manage information regarding user accounts, television schedule information, and operation of the system. New users are required to register with the Application Service Provider 1032. Using HTML forms, a user from Computer 1036 can submit registration data to be processed by Information Server 1050. Information provided by the user for proper operation of recording equipment includes the authentication information, equipment and connectivity identification, and programming source. Other information about the user such as email, telephone and/or fax may also be stored in the user account, hence the user may receive information such as selected television programs, reminders and other information regarding television program recordings via email, telephone and/or fax.

Upon receiving the above registration information from a user, Information Server 1050 stores the registration information in database 1044 on behalf of the user in her/his individual user account. Once the registration process is complete, the user then selects television programs to be recorded. Information Server 1050 serves HTML pages containing textual and graphical information regarding TV programming schedules stored in database 1044. To serve the HTML-pages, Information Server 1050 executes computer programs in the forms of Java Servlet or Common Gateway Interface (CGI) to search database 1044 and display television programming schedules. A user can view and select television programming schedules that are displayed based on her/his preferences such as: viewing dates, topics, actors, shown genres, review, etc. Information Server 1050 formats the retrieved television information into HTML pages that allow users to select TV programs to be recorded. The television schedule information may be displayed in spreadsheet forms having the axes time versus channels. For devices that only have a single television tuner, a spreadsheet user interface may be used in the following applications.

Whenever a user select a valid or non-conflicting television program, the interface disables the selection options for all conflicting television programs that are broadcast during the same time period. This method forces the user to deselect the current selection in order to select another program in the same scheduled time period. Whenever a user select a television program, the interface deselects all selected television programs that have conflicting viewing schedules.

Once the user submits his/her television program selections to Information Sever 1050, the information is stored in her/his account in database 1044. Also stored in his/her account is information regarding the status of network connection between Client Software 1038 and Control Server 1042. Whenever a Client Software 1038 establishes or terminates network connection with Control Server 1042, the events are noted in the user account to track the status of the network connection. Upon receiving the user selections, Information Sever 1050 accesses the user-account to check whether a valid network connection has been established between Client Software 1038 and Control Server 1042. If a valid connection is found, Information Server 1050 notifies the appropriate Control Server 1042 via Local Area Network that new user selections have been received and stored in database 1044 on behalf of the user. Upon receiving the notification from Information Server 1050, Control Server 1042 may also access database 1044 via Local Area Network to retrieve user-selected television information that has not been transmitted to Client Software 1038. Control Server 1042 then formats the retrieved information and transmits it to Client Software 1038. Upon receiving the user selections, Client Software 1038 sends them to remote control unit 1018 and updates the television recording schedule information in memory 1026. Once the user selections are stored in memory 1026 of remote control unit 1018, microprocessor 1024 can then compare the selected television programs with clock 1030 to start and stop the recording process.

In the preferred embodiment, Control Server 1042 is an application program executed in a conventional computer that is capable of establishing network communications with other computers using standard network protocol such as the Internet Protocol (IP). Client Software 1038 executed in Computer 1020 as shown in FIG. 14 can establish a persistent network connection with Control Server 1042 through TCP-IP protocol. Control Server 1042 is connected to database 1044 to retrieve user-selected TV program scheduling information. In the proposed system, there are at least two ways for Control Server 1042 to initiate the process of retrieving from database 1044 the user-selected television program information and sending the information to Client Software 1038.

Initiation may be based on notification from the Information Server 1050. When Information Server 1050 obtains user-specified television scheduling information to be recorded, it notifies the Control Server 1042. In turn, if network communication has been established between the Control Server 1042 and Client Software 1038, the Control Server 1042 retrieves the user selections and sends them to the Client Software 1038.

Alternatively, initiation may be based on notification from Client Software 1038. The Client Software 1038 notifies the Control Server 1042 to transmit user selections for recording. This notification would normally be sent when the Client Software 1038 initially establishes network connection with the Control Server 1042. The Control Server 1042 then retrieves user selections and sends them to Client Software 1038.

Information indicating user selections is stored in the database 1044. Such information can convey user preferences, useful in providing targeted advertising, rating of television programs, providing television program guides, suggestions, etc.

Figure 17:
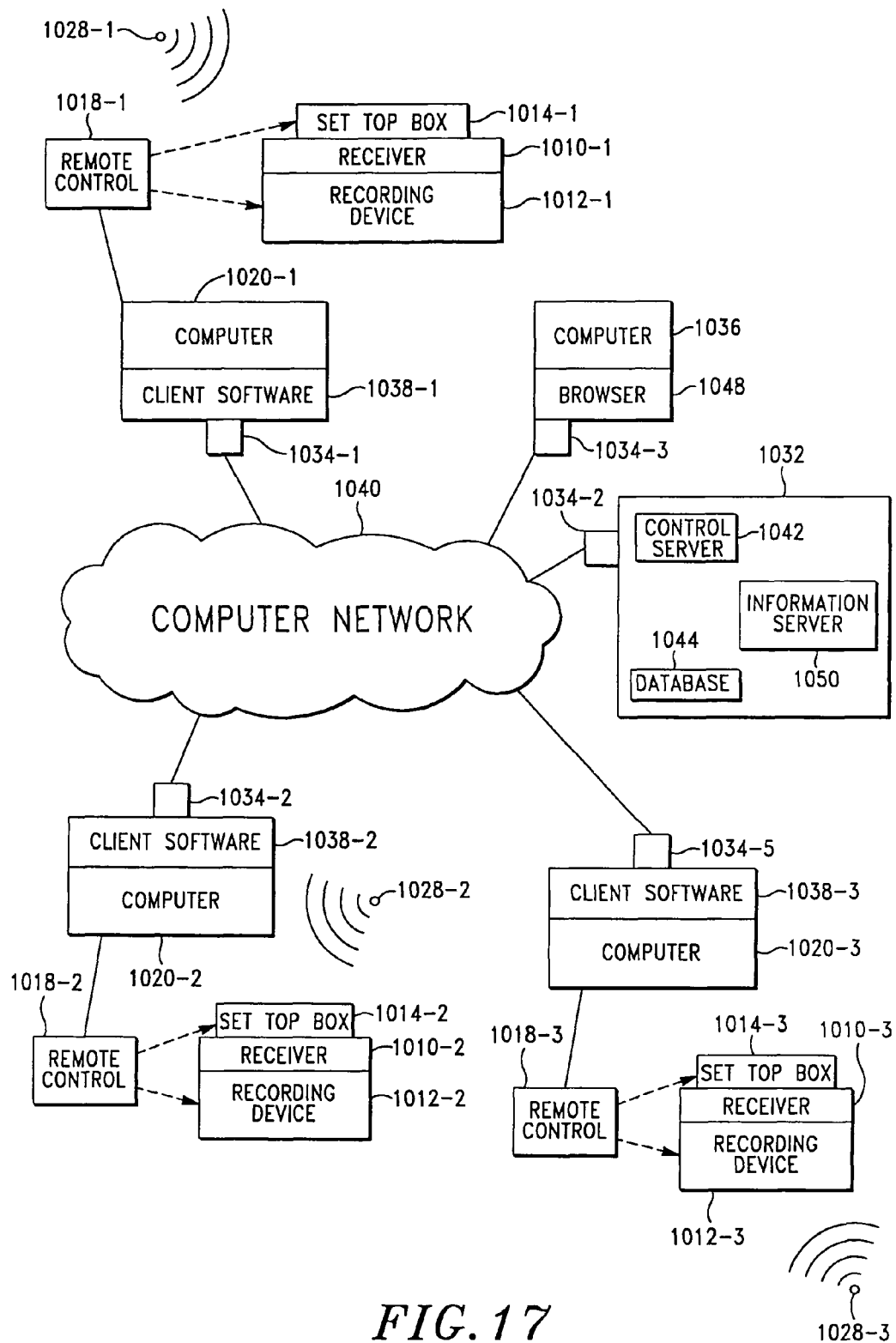
FIG. 17 illustrates an alternative embodiment of the service model of the present invention.

Directing attention to FIG. 17, in an alternative embodiment, service provider 1060 can maintain recording equipment at various physical locations 1062-1, 1062-2, . . . 1062-n, where n can be any number. Users can contact the service provider 1060's website and select programs for recording at the various physical locations 1062. Operating the recording equipment at the locations 1062 as explained above, the service provider can provide localized recordings to its users, either by transmitting audio and video over the computer network 1040 to computers 1036,1020, or sending the user a copy of the recording on a portable storage medium such as optical or magnetic storage.

While an apparatus, method, and service model for the remote control of recording devices via a computer network have been described in preferred embodiments, those of ordinary skill in the art will understand that many modifications maybe made thereto without changing the scope of the claims that follow. Accordingly, it is not intended that the scope of the invention in any way be limited by the above description, but instead be determined by reference to the claims that follow.

What is claimed is:

1. A method of remotely programming a remote controlled infrared device configured to receive program content from a program provider, said method comprising:

accessing an application service provider separate from the program provider, that includes a program database via a first connection over a network with a user processor;

selecting scheduling information provided by the program database of the application service provider via the first connection, wherein the scheduling information is associated with at least one program selected by a user;

establishing or verifying a second connection over the network between the application service provider and a control processor;

transmitting the scheduling information associated with the at least one program to the control processor via the second connection; and generating control signals based upon the scheduling information associated with the at least one program and sending the control signals to an infrared diode to generate infrared signals to control the remote controlled infrared device to receive the at least one program associated with the scheduling information; wherein program content of the at least one program is received from said program provider and wherein said application service provider transmits the scheduling information separately from the program provider.

2. The method of claim 1, wherein the remote controlled infrared device is a video recorder.

3. The method of claim 1, wherein the user processor comprises a device that has a central processing unit, memory and communication means to access the wide area network.

4. The method of claim 3, wherein the user processor comprises a desktop device.

5. The method of claim 3, wherein the user processor comprises a lap top device.

6. The method of claim 3, wherein the user processor comprises a palm top device.

7. A method of remotely operating recording equipment over an Internet, said recording equipment configured to record program content received from a program provider, said method comprising:

accessing an application service provider over the Internet with a user processor, wherein said application service provider is separate from the program provider and includes a program database;

selecting, via the first connection, scheduling information associated with at least one program selected by a user provided by the program database of the application service provider;

establishing or verifying a second connection over the Internet between the application service provider and a control processor;

transmitting, via the second connection, the scheduling information associated with the at least one program to the control processor; and controlling the recording equipment to record at least one program identified by the scheduling information, wherein the control processor is in a first physical location and the user processor is locatable at any location where the user processor is connectable with the Internet, and wherein program content of the at least one program is delivered from said program provider and said application service provider transmits the scheduling information separately from the program provider.

8. The method of claim 7, wherein the user processor comprises a device that has a central processing unit, memory and communication means to access the Internet.

9. The method of claim 7, wherein the user processor comprises a desktop device.

10. The method of claim 7, wherein the user processor comprises a lap top device.

11. The method of claim 7, wherein the user processor comprises a palm top device.

12. The method of claim 7, wherein the recording equipment comprises a video recorder that includes a tuning device and recording media.

13. The method of claim 12, wherein the recording media comprises magnetic tape.

14. The method of claim 12, wherein the recording media comprises a magnetic disk.

15. The method of claim 12, wherein the recording media comprises an optical disk.

16. The method of claim 7, wherein the recording equipment comprises an audio recorder.

17. The method of claim 7, wherein the recording equipment comprises a television.

18. The method of claim 7, wherein the user processor is connectable to the Internet to access the application service provider for selection of scheduling information associated with programs to be captured by a plurality of recording devices; and wherein the application service provider transmits the respective selected scheduling information associated with programs over the Internet to a plurality of control processors, each of said control processors controlling a respective recording device to record at least one program identified by the selected scheduling information.

19. The method of claim 18, wherein the selected scheduling information associated with programs is the same for transmitting to each control processor.

20. The method of claim 18, wherein different selected scheduling information associated with programs is transmitted to at least two of the control processors.

21. The method of claim 18, wherein different selected scheduling information associated with programs is transmitted to each respective control processor.

22. A method of remotely operating recording equipment over an Internet, said method comprising:

establishing or verifying a first connection over the Internet between an application service provider with a user processor;

providing at least a portion of a program database via the first connection over the Internet in response to a user request, the program database comprising information about at least one television program;

accepting a program selection by the application service provider, via the first connection, from the user processor;

generating, by the application service provider, scheduling instructions associated with the program selection from the program database;

establishing or verifying a second connection over the Internet between the application service provider and a control processor;

transmitting, via the second connection, the scheduling instructions to the control processor in order to cause recording equipment associated with the control processor to record the selected program, wherein the program is received from a program provider separate from said application service provider, and said application service provider transmits the scheduling information separately from the program provider.

* * * * *